(12) United States Patent
Fukui et al.

(10) Patent No.: US 10,865,677 B2
(45) Date of Patent: Dec. 15, 2020

(54) EXHAUST GAS PURIFICATION DEVICE

(71) Applicant: Yanmar Co., Ltd., Osaka (JP)

(72) Inventors: Yoshinori Fukui, Osaka (JP); Arata Hayata, Osaka (JP); Yoshihiro Yamaguchi, Osaka (JP); Tsuyoshi Inoue, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 21 days.

(21) Appl. No.: 15/559,034

(22) PCT Filed: Mar. 14, 2016

(86) PCT No.: PCT/JP2016/001447
§ 371 (c)(1),
(2) Date: Sep. 15, 2017

(87) PCT Pub. No.: WO2016/147649
PCT Pub. Date: Sep. 22, 2016

(65) Prior Publication Data
US 2018/0080356 A1    Mar. 22, 2018

(30) Foreign Application Priority Data

Mar. 18, 2015 (JP) ................ 2015-054481

(51) Int. Cl.
*F01N 3/05* (2006.01)
*F01N 3/22* (2006.01)
(Continued)

(52) U.S. Cl.
CPC .............. *F01N 3/05* (2013.01); *B01D 53/94* (2013.01); *F01N 3/023* (2013.01); *F01N 3/08* (2013.01);
(Continued)

(58) Field of Classification Search
CPC . B01D 53/94; B01D 53/9409; F01N 2590/02; F01N 3/023; F01N 3/05;
(Continued)

(56) References Cited

U.S. PATENT DOCUMENTS 5,390,492 A * 2/1995 Levendis ............... F01N 3/023
                                                    55/302
5,634,952 A * 6/1997 Kasai .................... F01N 3/023
                                                    55/302
(Continued)

FOREIGN PATENT DOCUMENTS

CN      2900803 Y      5/2007
JP      1984-129320 A  7/1984
(Continued)

OTHER PUBLICATIONS

International Search Report dated May 31, 2016 issued in corresponding PCT Application PCT/US2016/001447cites the foreign patent documents above.
(Continued)

*Primary Examiner* — Phutthiwat Wongwian
*Assistant Examiner* — Diem T Tran
(74) *Attorney, Agent, or Firm* — Norton Rose Fulbright US LLP

(57) ABSTRACT

An embodiment of an exhaust gas purification device has a function of removing soot adhered to an NOx catalyst arranged inside a cylindrical casing part by injecting pressurized air. The device includes a plurality of air injection nozzles arranged on a side wall of the casing part on an upstream side of the NOx catalyst, which are each configured to generate an impulse wave by injecting pressurized air into the casing part, wherein the air injection nozzles successively inject one by one an equal flow quantity of pressurized air, for a period, at predetermined time intervals.

19 Claims, 13 Drawing Sheets

(51) Int. Cl.
*F01N 3/08* (2006.01)
*F01N 3/28* (2006.01)
*B01D 53/94* (2006.01)
*F01N 3/20* (2006.01)
*F01N 3/023* (2006.01)

(52) U.S. Cl.
CPC ............ *F01N 3/20* (2013.01); *F01N 3/2066* (2013.01); *F01N 3/22* (2013.01); *F01N 3/28* (2013.01); *B01D 53/9409* (2013.01); *F01N 2590/02* (2013.01)

(58) Field of Classification Search
CPC ........... F01N 3/08; F01N 3/20; F01N 3/2066; F01N 3/22; F01N 3/28
See application file for complete search history.

(56) References Cited

U.S. PATENT DOCUMENTS

| | | | | |
|---|---|---|---|---|
| 5,655,366 | A * | 8/1997 | Kawamura | ........... F01N 3/0212 55/487 |
| 5,725,618 | A * | 3/1998 | Shimoda | ........... B01D 46/0063 55/283 |
| 5,853,438 | A * | 12/1998 | Igarashi | ........... B01D 39/2093 55/302 |
| 5,853,468 | A | 12/1998 | Yamazaki et al. | |
| 7,954,313 | B2 * | 6/2011 | Hirata | ........... B01D 53/944 60/286 |
| 9,719,386 | B2 * | 8/2017 | Fan | ........... F01N 3/2066 |
| 2005/0150220 | A1 | 7/2005 | Johnson et al. | |
| 2006/0070359 | A1 * | 4/2006 | Sellers | ........... B01D 46/0064 55/303 |
| 2010/0319731 | A1 | 12/2010 | Spruegel et al. | |
| 2011/0258991 | A1 * | 10/2011 | Hwang | ........... F01N 3/2053 60/295 |

FOREIGN PATENT DOCUMENTS

| | | |
|---|---|---|
| JP | 02-75711 A | 3/1990 |
| JP | 1993-012619 U | 2/1993 |
| JP | H08-023288 B2 | 3/1996 |
| JP | H09-112248 A | 4/1997 |
| JP | 2008-32019 A | 2/2008 |
| JP | 2013-116451 A | 6/2013 |
| JP | 2013-164078 A | 8/2013 |
| JP | 2014-128762 A | 7/2014 |
| JP | 2014128762 * | 7/2014 |
| JP | 2015-190458 A | 11/2015 |
| WO | 2014/117357 A1 | 8/2014 |

OTHER PUBLICATIONS

European Search Report dated Jul. 3, 2018 issued in corresponding European Application No. 16764480.6 cites the patent documents above.
Chinese Office Action dated Feb. 12, 2019 issued in corresponding Chinese Application No. 201600007221.9 cites the patent documents above.
Korean Office Action dated Oct. 15, 2018 issued in corresponding Korean Application No. 10-2017-7028071 cites the patent documents above.
Office Action dated Feb. 12, 2019 for CN Application No. 201680007221.9, which cites the document herein.
Chinese Office Action dated Jul. 30, 2019 issued in corresponding Chinese Application No. 201680007221.9 cites patent document above.

* cited by examiner

EXHAUST GAS PURIFICATION DEVICE

CROSS REFERENCES TO RELATED APPLICATIONS

This application is a national stage application pursuant to 35 U.S.C. § 371 of International Application No. PCT/JP2016/001447, filed on Mar. 14, 2016, which claims priority under 35 U.S.C. § 119 to Japanese Patent Application No. 2015-054481, filed on Mar. 18, 2015, the disclosures of which are hereby incorporated by reference in their entireties.

TECHNICAL FIELD

An embodiment of the present invention relates to an exhaust gas purification device for an internal combustion engine.

BACKGROUND ART

Exhaust gas from an internal combustion engine contains carbon dioxide, nitrogen oxides, particulate substances, and the like. Of these substances, nitrogen oxides (hereinafter, NOx) are harmful to human bodies and cause acid rains. For this reason, an exhaust path of the internal combustion engine sometimes has an exhaust gas purification device configured to remove NOx from exhaust gas.

Currently, in an exhaust gas purification device configured to remove NOx, a selective catalytic reduction method (hereinafter, SCR method) using urea or ammonia as a reductant is typically adopted. This SCR method uses an NOx catalyst having a honeycomb structure, which is made of a material having an active ingredient such as V or Cr supported by a carrier of an oxide such as Ti.

In cases where urea water is used as the reductant, the urea water is injected on the upstream side of the NOx catalyst, and is subjected to hydrolysis by the exhaust gas to become ammonia. Then, by having the ammonia contact with the NOx catalyst, the ammonia acts on the NOx, thus decomposing the NOx into harmless nitrogen and water.

Here, the above NOx catalyst having a honeycomb structure has many through holes. Therefore, when the exhaust gas passes these through holes, soot contained in the exhaust gas may clog the holes by adhering to the NOx catalyst, thus lowering reductive reaction. In view of this, study has been conducted on a technology to remove soot adhered to the NOx catalyst, by injecting pressurized air to the NOx catalyst.

As a traditional exhaust gas purification device which removes soot adhered to the NOx catalyst, for example, a device that continuously injects pressurized air for 5 to 10 minutes, and for example, a device that intermittently injects pressurized air for 5 to 10 seconds, at intervals of several minutes are considered. It should be noted that the injection velocity of the pressurized air is approximately 20 m/s to 40 m/s, for example. In cases of removing the soot by having the injected pressurized air impact the soot adhered to the NOx catalyst, the longer the injection period, the higher the removal rate becomes.

CITATION LIST

Patent Literature

PTL1: Japanese Patent Application Laid-Open No. S59-129320 (1984)

SUMMARY OF INVENTION

Technical Problem

The above-described traditional exhaust gas purification device requires a large amount of air because the soot is removed by having the injected pressurized air impact the soot adhered to the NOx catalyst. Further, in order to raise the removal rate, the injection period of the pressurized air needs to be long. This further necessitates a larger amount of air.

Further, in cases of providing a plurality of air injection nozzles configured to inject the same amount of pressurized air at the same time, a large amount of air is required at the time of injection. In this case, the amount of air used increases with an increase in the number of air injection nozzles.

Since the traditional exhaust gas purification device requires a large amount of air at the time of injection, as hereinabove described, an air supply having a large capacity is used. For this reason, the air supply increases in size. For example, in an exhaust gas purification device built in a ship, a compressor, an air tank, a pressure reducing valve, and the like serving as the air supply increase in size. In a ship with limited loadage, such an increase in size of the air supply reduces the loadage for cargo. Further, since the traditional exhaust gas purification device requires a large amount of air at the time of injection, a piping system for the air will become one with a large diameter. This leads to reduced loadage for cargo and increased equipment costs in a ship with limited loadage.

It is there for an object of the present invention to provide an exhaust gas purification device capable of accurately removing soot adhered to an NOx catalyst, while enabling reduction of the capacity of an air supply for pressurized air to be injected.

Solution to Problem

An embodiment of an exhaust gas purification device has a function of removing soot adhered to a catalyst arranged inside a cylindrical casing by injecting pressurized air. Such an exhaust gas purification device includes a plurality of air injection nozzles arranged on a side wall of the casing, which are each configured to generate an impulse wave by injecting pressurized air into the casing, wherein the air injection nozzles successively inject one by one an equal flow quantity of pressurized air, for a period t1, at predetermined time intervals.

Advantageous Effects of Invention

With the present invention, soot adhered to an NOx catalyst can be accurately removed, while the capacity of an air supply for pressurized air to be injected can be reduced.

DESCRIPTION OF EMBODIMENT

An embodiment of the present invention will be described hereinafter with reference to the drawings.

(Overview of Ship 1)

Figure 1:
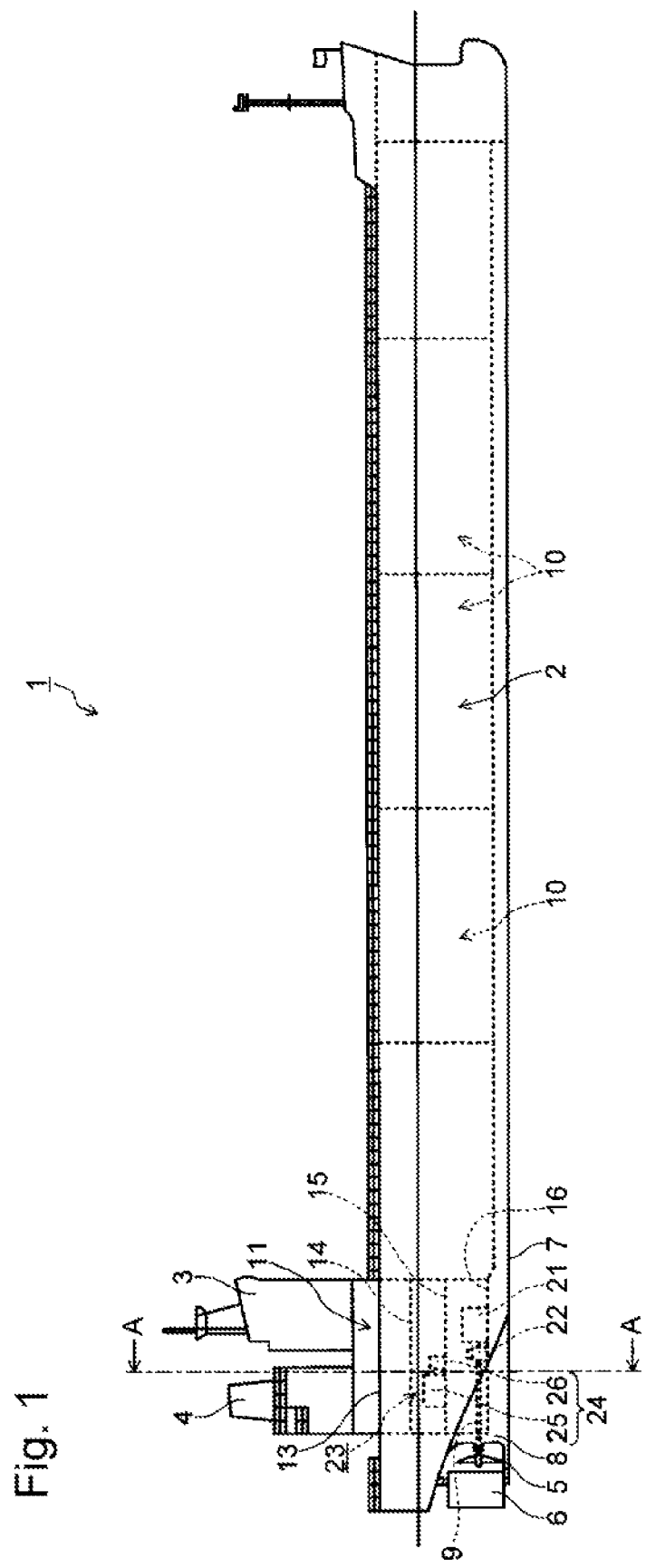
FIG. 1 A diagram schematically showing a ship having an exhaust gas purification device of an embodiment.

FIG. 1 is a diagram schematically showing a ship 1 having an exhaust gas purification device 50 of an embodiment. It should be noted that the following deals with an exemplary application of the exhaust gas purification device 50 of this embodiment to a diesel generator 24 built in the ship 1.

First, an overview of the ship 1 is described with reference to FIG. 1. The ship 1 includes: a ship hull 2, a cabin 3 (bridge) provided on the stern side of the ship hull 2, a funnel 4 (chimney) positioned behind the cabin 3, and a propeller 5 and a rudder 6 provided on a lower back portion of the ship hull 2. In this case, a skeg 8 is integrally formed on the ship bottom 7 on the stern side. On this skeg 8, a propeller shaft 9 for driving to rotate the propeller 5 is pivotally supported.

On a stem side and a middle part of the ship hull 2, a plurality of compartmented holds 10 are provided. Further, on the stern side of the ship hull 2, an engine room 11 is provided.

In the engine room 11, a main engine 21 (e.g., diesel engine) serving as a driving force for the propeller 5, a speed reducer 22, and a power generator 23 configured to supply power to an electric system in the ship hull 2 are arranged. The propeller 5 is driven and rotated by the rotational power from the main engine 21 via the speed reducer 22.

The inside of the engine room 11 is parted relative to the up and down directions, by an upper deck 13, a second deck 14, a third deck 15, and an inner bottom plate 16. In this example, the main engine 21 and the speed reducer 22 are disposed on the inner bottom plate 16 at the lowermost stage of the engine room 11, and a power generator 23 is disposed on the third deck 15 in the middle stage of the engine room 11.

(Overview of Exhaust System of Power Generator 23)

Next, the following describes an overview of an exhaust system of the power generator 23.

Figure 2:
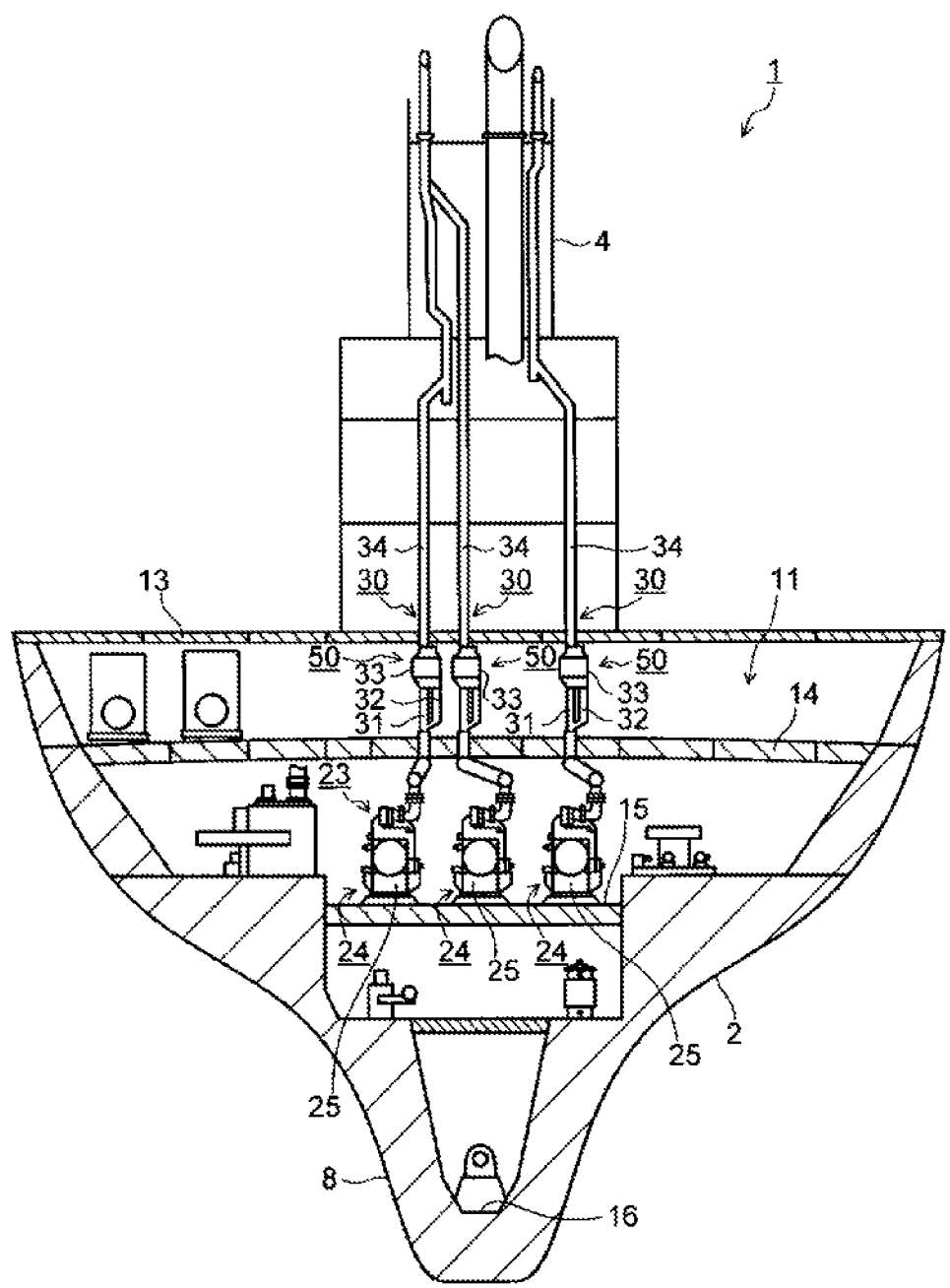
FIG. 2 A diagram showing a cross-section taken along A-A of FIG. 1.

FIG. 2 is a diagram showing a cross-section taken along A-A of FIG. 1. As shown in FIG. 2, the power generator 23 includes a plurality of diesel generators 24. It should be noted that in this example there are three diesel generators 24. The diesel generators 24 each includes: a power generation engine 25 and a generator 26 configured to generate power by being driven by the power generation engine 25. It should be noted that in this example a diesel engine is used as the power generation engines 25. Further, in the following, an upstream side indicates an upstream side relative to a direction of a flow of a fluid, whereas a downstream side indicates a downstream side relative to a direction of a flow of a fluid.

Basically, the diesel generators 24 are efficiently operated according to electric energy required in the ship hull 2. For example, all the diesel generators 24 are operated when a large amount of power is consumed, such as a time of arriving or leaving a port. On the other hand, an arbitrary number of diesel generators 24 is/are operated while the power consumption is relatively small, such as a time of anchorage. Generated power by each generator 26 is supplied to electric system in the ship hull 2.

An exhaust path 30 of each of the power generation engines 25 extends to the funnel 4, and is directly in communication with the outside, as shown in FIG. 2. For example, a single exhaust path 30 is provided for a single power generation engine 25. In this example, there are three power generation engines 25, and therefore three exhaust paths 30 are provided. It should be noted that the exhaust paths 30 all have the same structure.

Each exhaust path 30, for example, includes: a bypass path 31 extended to the funnel 4, a main path 32 branched off from an intermediate portion of the bypass path 31, and a composite casing 33 having the bypass path 31 and the main path 32 provided side-by-side. Further, the exhaust path 30 has an exhaustion outlet portion where the bypass path 31 and the main path 32 join together, which is formed on the downstream side inside the composite casing 33. The exhaustion outlet portion is described later. Further, the exhaust path 30 includes a joined path 34 extended from the exhaustion outlet portion to the funnel 4.

The composite casing 33 is positioned above the third deck 15 where the power generation engine 25 is arranged. The structure of the composite casing 33 is detailed later.

The exhaust path 30 from the power generation engine 25 to the composite casing 33 is, for example, structured by cylindrical pipes. The joined path 34 on the downstream side of the composite casing 33 to is also, for example, structured by a cylindrical pipe.

(Structure of Exhaust Gas Purification Device 50)

Next, the following describes a structure of the exhaust gas purification device 50 of the embodiment.

Figure 3:
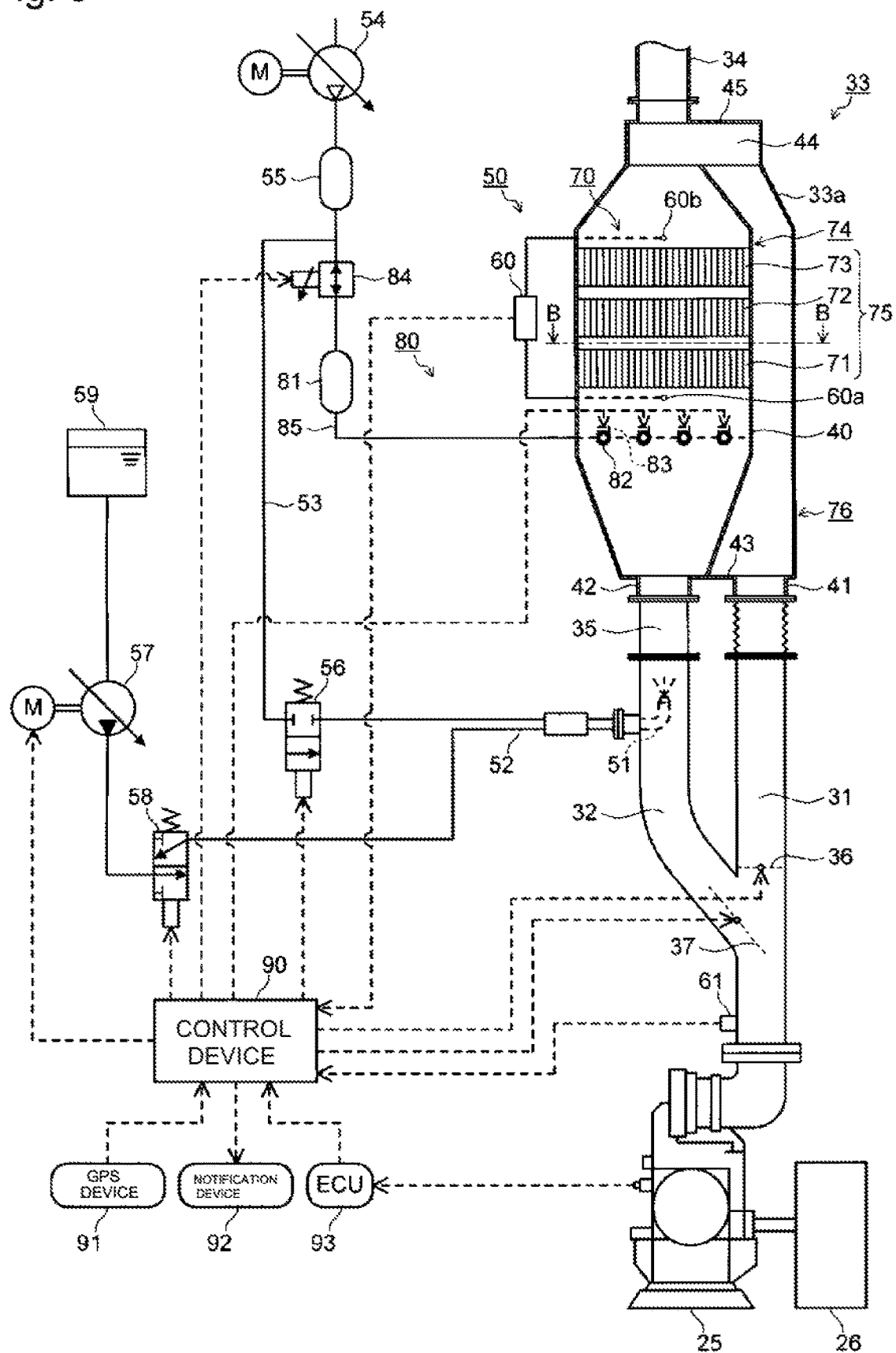
FIG. 3 A diagram schematically showing an overall structure of an exhaust system having an exhaust gas purification device of the embodiment.
Figure 4:
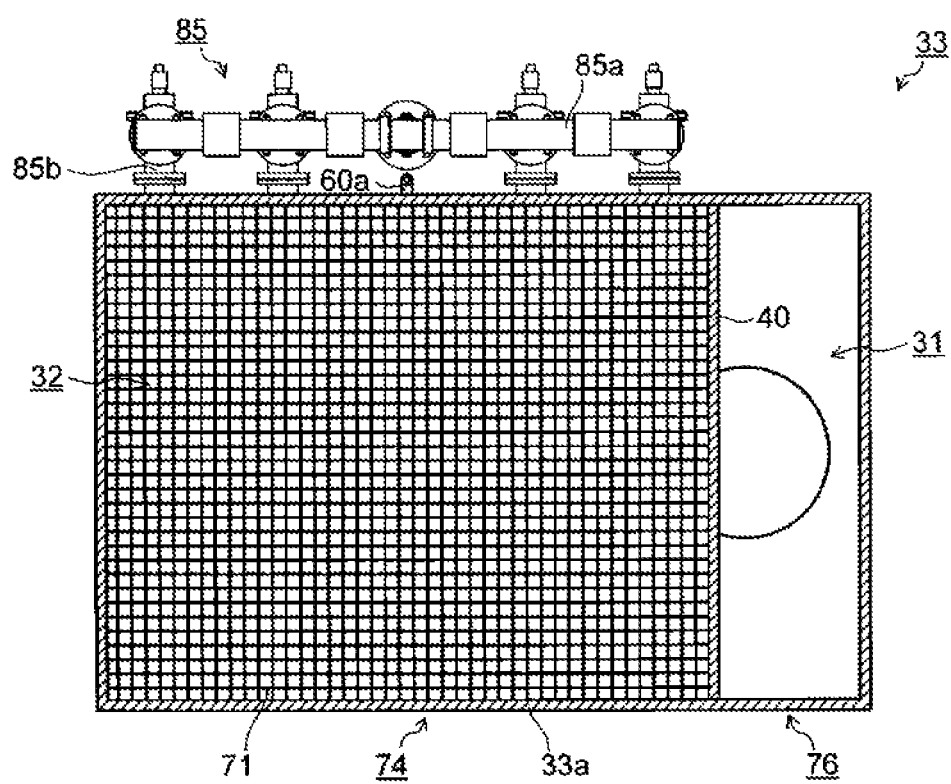
FIG. 4 A diagram showing a cross-section taken along B-B of FIG. 3.
Figure 5:
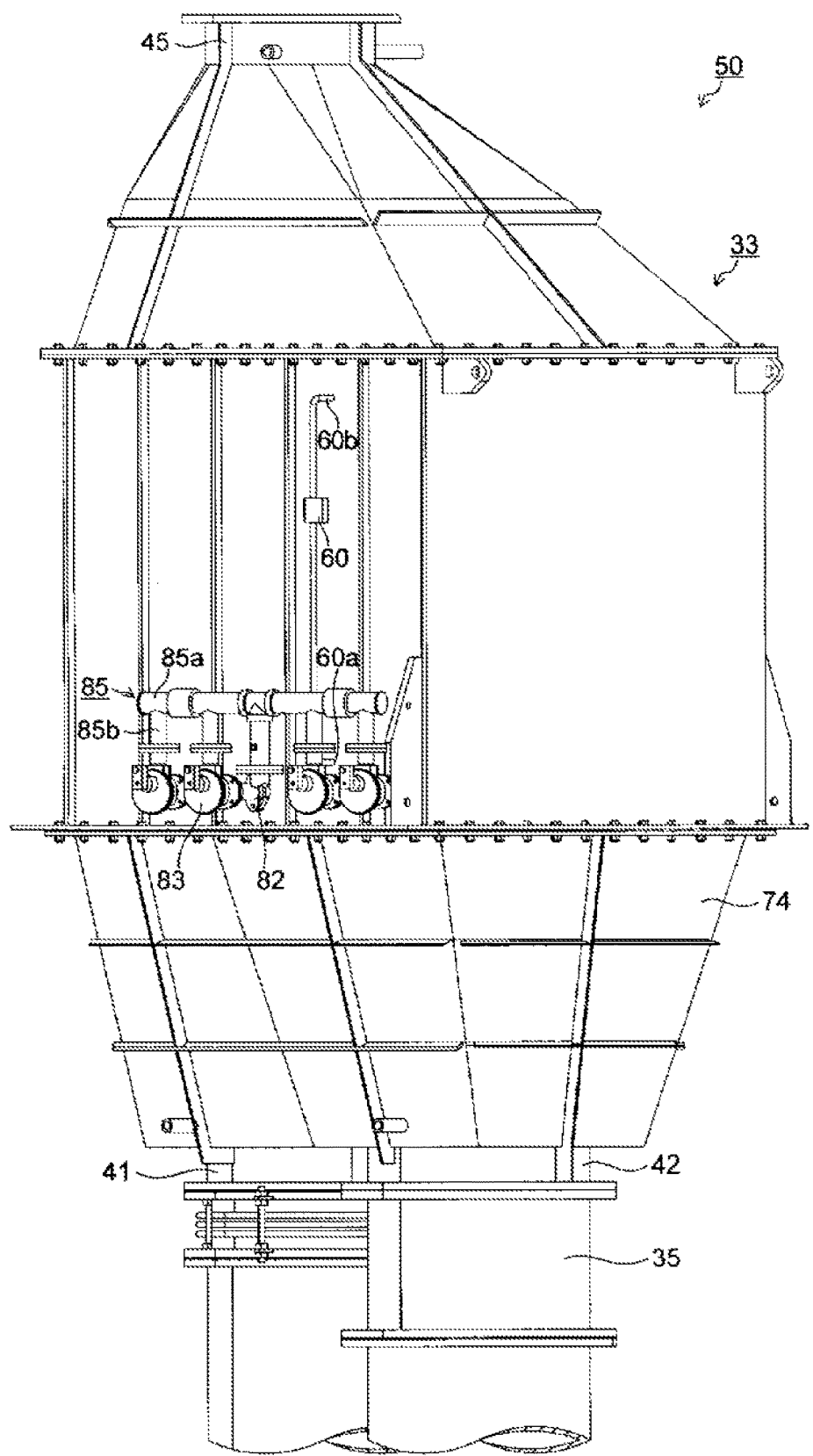
FIG. 5 A perspective view of the exhaust gas purification device of the embodiment.

FIG. 3 is a diagram schematically showing an overall structure of an exhaust system having an exhaust gas purification device 50 of the embodiment. FIG. 4 is a diagram showing a cross-section taken along B-B of FIG. 3. FIG. 5 is a perspective view of the exhaust gas purification device 50 of the embodiment.

First, the structure of the composite casing 33 having the exhaust gas purification device 50 is described. The composite casing 33 is structured by, for example, a quadrangular tube made of a refractory metal material. The composite casing 33 has the bypass path 31 and the main path 32 provided side-by-side, as hereinbefore described.

As shown in FIG. 3 and FIG. 4, in the composite casing 33, a partition plate 40 is arranged which extends in the direction of the flow of the exhaust gas. This partition plate 40 parts subdivides the inside of the composite casing 33 into a bypass path 31 side and a main path 32 side. Then, as shown in FIG. 4, the bypass path 31 and the main path 32 both structure paths whose passage cross-sections are rectangular shape (quadrangular shape). Specifically, as shown in FIG. 4, a part of an outline casing 33a constituting the outline of the composite casing 33 and the partition plate 40 forms a casing part 76 forming the bypass path 31 and a casing part 74 forming the main path 32. It should be noted that the exhaust gas purification device 50 is provided in the main path 32 in the composite casing 33, i.e., in the casing part 74.

The upstream side end portion of the partition plate 40 is fixed to an upstream side end surface 43 of the composite casing 33, where a main side introduction pipe 41 of the bypass path 31 and a bypass side introduction pipe 42 of the main path 32 are fixed, as shown in FIG. 3. The main path 32 on the downstream side of the bypass side introduction pipe 42 is formed in an expanding shape such that its cross-sectional area increases as it goes towards the downstream side (in a diffuser shape).

On the other hand, the downstream side end portion of the partition plate 40 ends in the exhaustion outlet portion 44 formed on the downstream side of the composite casing 33, where the bypass path 31 and the main path 32 join together. The main path 32 on the side of the exhaustion outlet portion 44 is tapered with its downstream end narrowed in such a manner that the cross-sectional area of the path is reduced as it goes towards the downstream side. It should be noted that the exhaustion outlet portion 44 has a delivery pipe 45 connected to the joined path 34.

Switching for causing the exhaust gas to flow through the bypass path 31 or the main path 32 is done by a first on-off valve 36 and a second on-off valve 37. The first on-off valve 36 is provided in the bypass path 31 on the downstream side of a portion where the path branches off from the main path 32, as shown in FIG. 3. It should be noted that the first on-off valve 36 is provided on the upstream side of the composite casing 33. The second on-off valve 37 is provided on the main path 32 nearby the branching portion. It should be noted that the second on-off valve 37 is provided on the upstream side of, for example, a urea water injection nozzle 51.

The first on-off valve 36 and the second on-off valve 37 are structured to be capable of open and close in association with each other. More specifically, the first on-off valve 36 and the second on-off valve 37 are structured so that the first on-off valve 36 is in a close-state while the second on-off valve 37 is in an open-state, and that the first on-off valve 36 is in the open-state while the second on-off valve 37 is in the close-state.

This way, a path to supply the exhaust gas to the exhaust gas purification device 50 is formed when the second on-off valve 37 is in the open-state and the first on-off valve 36 is in the close-state (the state shown in FIG. 3). On the other hand, a path to release the exhaust gas to the outside (to the atmosphere) without purifying the gas through the exhaust gas purification device 50 is formed when the second on-off valve 37 is in the close-state and the first on-off valve 36 is in the open-state.

Next, the following describes the exhaust gas purification device 50.

The exhaust gas purification device 50 is for purifying the exhaust gas from the power generation engine 25 which drives the generator 26. The exhaust gas purification device 50 includes a soot-blower unit. The soot-blower unit is configured to remove soot adhered to an NOx catalyst 75 of a catalytic reaction unit 70, by injecting pressurized air. It should be noted that the NOx catalyst 75 is provided in the main path 32 in the composite casing 33.

As shown in FIG. 3, the exhaust gas purification device 50 is mainly provided in the main path 32. The exhaust gas purification device 50 includes: the urea water injection nozzle 51, a urea supply passage 52, a urea water tank 59, a first air supply passage 53, a pressurized air supply pump 54 (compressor), an air tank 55, a urea-use air valve 56, a urea water supply pump 57, a switching valve 58, the catalytic reaction unit 70, the soot-blower unit 80, a differential pressure sensor 60, and an exhaust gas temperature sensor 61.

Further, the exhaust gas purification device 50 includes, for example, a control device 90, a GPS (Global Positioning System) device 91, a notification device 92, and an ECU (Engine Control Unit) 93. The exhaust gas purification device 50 further includes, for example, a mixer 35 between the urea water injection nozzle 51 and the composite casing 33.

The urea water injection nozzle 51 is configured to supply urea water inside the main path 32. The urea water injection nozzle 51 is structured by a tubular member. The urea water injection nozzle 51 is provided on the upstream side of the catalytic reaction unit 70. More specifically, the urea water injection nozzle 51 is positioned, for example, in the main path 32, on the upstream side of the mixer 35 as shown in FIG. 3. The urea water injection nozzle 51 is connected to the urea supply passage 52 which is a passage for the urea water. Further, the urea water injection nozzle 51 is connected to the first air supply passage 53 which is a passage for pressurized air. It should be noted that, on the downstream side of the air tank 55, the passage for pressurized air is branched into the first air supply passage 53 and a later-described second air supply passage 85.

The pressurized air supply pump 54 is configured to supply pressurized air. The pressurized air supply pump 54 is, for example, pressurizes (compresses) and supplies the air. The pressurized air supply pump 54 supplies air to the air tank 55 (reserve tank 81), when the pressure of the air tank 55 (reserve tank 81) drops below a predetermined pressure. Then, when the pressure of the air tank 55 (reserve tank 81) reaches a predetermined pressure, the pressurized air supply pump 54 stops. It should be noted that the pressurized air supply pump 54 is not particularly limited, as long as it can maintain the pressure of the air tank 55 (reserve tank 81) to a predetermined pressure.

The urea-use air valve 56 is configured to communicate or block the passage for pressurized air. The urea-use air valve 56 is provided in the first air supply passage 53. The urea-use air valve 56 is structured by, for example, an electromagnetic valve and the like. Further, by the urea-use air valve 56 making the first air supply passage 53 in a communication state, pressurized air is supplied to the urea water injection nozzle 51.

The urea water supply pump 57 is configured to supply urea water. The urea water supply pump 57 is provided in the urea supply passage 52. The urea water supply pump 57 supplies urea water in the urea water tank 59 to the urea water injection nozzle 51 via the urea supply passage 52, at a predetermined flow quantity.

The switching valve 58 is configured to block or communicate the urea supply passage 52. The switching valve 58 is provided on the downstream side of the urea water supply pump 57 in the urea supply passage 52. The switching valve 58 is structured by, for example, an electromagnetic valve and the like. By the switching valve 58 making the urea supply passage 52 in a communication state, the urea water is supplied to the urea water injection nozzle 51.

The catalytic reaction unit 70 is configured to selectively reduce NOx in the exhaust gas with the NOx catalyst 75. The catalytic reaction unit 70 is provided in the main path 32 in the composite casing 33. As shown in FIG. 3 and FIG. 4, the catalytic reaction unit 70 includes the cylindrical casing part 74 and the NOx catalyst 75 arranged inside the casing part 74. It should be noted that the casing part 74 also constitutes a part of the main path 32 in the composite casing 33, which extends in the direction in which the exhaust gas flows. Such a casing part 74 is structured by, for example, a quadrangular tube.

In the casing part 74, for example, a first NOx catalyst 71, a second NOx catalyst 72, and a third NOx catalyst 73 are arranged in this order from the upstream side, at predetermined intervals, in the direction of the flow of the exhaust gas. The casing part 74 is structured so as to enable the first NOx catalyst 71, the second NOx catalyst 72, and the third NOx catalyst 73 to be closed therein in a detachable manner. It should be noted that this example deals with a case of three stages of NOx catalysts; however, the structure is not limited to this. The NOx catalyst may be, for example, a single stage, or a plurality of stages.

For example, the NOx catalyst 75 is formed by a material containing metal such as alumina, zirconia, vanadia/titania or zeolite. The NOx catalyst 75 is structured by a substantially rectangular parallelepiped member having a honeycomb structure in which many through holes are formed. The NOx catalyst 75 is arranged inside the casing part 74 so that the axial direction of each through hole matches with the flow direction of the exhaust air. This way, the exhaust gas supplied from the upstream side of the casing part 74 passes the through holes of the NOx catalyst 75, in an order of the first NOx catalyst 71, the second NOx catalyst 72, and the third NOx catalyst 73, and then is discharged from the catalytic reaction unit 70 to the exhaustion outlet portion 44.

The soot-blower unit 80 generates an impulse wave by injecting pressurized air to remove the soot blower unit adhered to the NOx catalyst 75. The soot-blower unit 80 includes: the air injection nozzle 82, an injection valve 83, a pressure control valve 84, and the second air supply passage 85.

The air injection nozzle 82 injects pressurized air into the casing part 74 to generates an impulse wave. The air injection nozzle 82 is structured by, for example, a nondirectional nozzle. In other words, the impulse wave generated from the outlet of the air injection nozzle 82 does not have directivity. Therefore, the impulse wave from the outlet of the air injection nozzle 82 evenly propagates in every direction such as upward, downward, leftward, and rightward directions.

The air injection nozzle 82 is arranged, for example, on a side wall of the casing part 74, on the upstream side of the first NOx catalyst 71 at the uppermost stream. For example, as shown in FIG. 4 and FIG. 5, on one side wall of the casing part 74 structured by a quadrangular tube, the air injection nozzle 82 is arranged so as to penetrate the casing part 74. In this example, a plurality of air injection nozzles 82 are arranged, for example, at regular intervals in the width direction of the one side wall of the casing part 74. The direction of the injection port of each air injection nozzle 82 is not particularly limited; however, it is preferable that the nozzles are directed to the same direction. The direction of the injection port of the air injection nozzle 82 may be, for example, a direction perpendicular to the direction of the flow of the exhaust gas.

Since each of the air injection nozzles 82 is arranged on the side wall of the casing part 74 as described, no large space is necessary behind the side wall of the casing part 74 for detaching the air injection nozzle 82 by pulling out the same backward from the side wall.

Further, as shown in FIG. 3, the air injection nozzle 82 is connected to the reserve tank 81 via the second air supply passage 85 serving as a passage for pressurized air. It should be noted that the reserve tank 81 is connected to the air tank 55 arranged in a separate position.

The injection valve 83 is configured to communicate or block the passage for pressurized air. The injection valve 83 is structured by an electromagnetic on-off valve which uses pilot air. The injection valve 83 is provided in the second air supply passage 85 connected to the air injection nozzle 82. The injection valve 83 is configured to be capable of switching between supplying or not-supplying pressurized air from the reserve tank 81 to the air injection nozzle 82.

In the present embodiment, the plurality of the air injection nozzles 82 are activated on a one-by-one basis. Therefore, one injection valve 83 is provided for each of the air injection nozzles 82. It should be noted that, by the injection valve 83 communicating the second air supply passage 85 with the air injection nozzle 82, pressurized air is supplied to the air injection nozzle 82.

The pressure control valve 84 changes the pressure of the pressurized air. As shown in FIG. 3, the pressure control valve 84 is provided, for example, in the second air supply passage 85, on the upstream side of the reserve tank 81 and on the downstream side of the branching portion of the first air supply passage 53 and the second air supply passage 85. The pressure control valve 84 is capable of changing the pressure of the pressurized air in the reserve tank 81 with a signal from the control device 90. This way, for example, in the soot-blower unit 80, the pressure of the pressurized air can be changed according to the state of the NOx catalyst 75.

The second air supply passage 85 supplies the pressurized air. The second air supply passage 85 connects the reserve tank 81 to the air injection nozzle 82. As shown in FIG. 4 and FIG. 5, the second air supply passage 85 includes, for example, a blow pipe 85a, and a nozzle pipe 85b branching off from the blow pipe 85a.

The blow pipe 85a is a pipe directly connected to the reserve tank 81. In this blow pipe 85a, the pressure control valve 84 is intervened. The nozzle pipe 85b is a pipe for supplying the pressurized air to each air injection nozzle 82. Therefore, the number of the nozzle pipes 85b provided corresponds to the number of the air injection nozzles 82. As shown in FIG. 5, in each nozzle pipe 85b, the injection valve 83 is intervened. At the downstream end of the nozzle pipe 85b, the air injection nozzle 82 is attached.

A traditional blow pipe has a larger pipe diameter than that of the nozzle pipe, because the flow quantity of pressurized air to be supplied to a plurality of nozzle pipes needs to be ensured. To the contrary, the pipe diameter of the blow pipe 85a in the present embodiment is equal to that of the nozzle pipe 85b.

For example, as shown in FIG. 5, the nozzle pipe 85b is bent at a position where the injection valve 83 intervenes, and extends towards the side wall of the casing part 74. On the other hand, the nozzle pipe 85b and the blow pipe 85a on the upstream side of the bent portion are piped in a direction different from the piping direction of the nozzle pipe 85b on the downstream side of the bent portion. That is, the nozzle pipe 85b and the blow pipe 85a on the upstream side of the bent portion are not piped in a direction perpendicular to the side wall of the casing part 74. By piping the second air supply passage 85 in this way, no large space is necessary behind the side wall of the casing part 74 for detaching the air injection nozzle 82 by pulling out the same backward from the side wall.

As shown in FIG. 3, the differential pressure sensor 60 is configured to detects a differential pressure $\Delta P$ between the exhaust gas pressure on the upstream side of the catalytic reaction unit 70 and the exhaust gas pressure on the downstream side of the catalytic reaction unit 70. The differential pressure sensor 60 includes: an upstream side pressure detection unit 60a and a downstream side pressure detection unit 60b. The upstream side pressure detection unit 60a is arranged on the upstream side of the catalytic reaction unit 70, and the downstream side pressure detection unit 60b is arranged on the downstream side of the catalytic reaction unit 70. That is, the differential pressure sensor 60 detects the differential pressure $\Delta P$ between the exhaust gas pressure on the upstream side of the first NOx catalyst 71 and the exhaust gas pressure on the downstream side of the third NOx catalyst 73. With this differential pressure sensor 60, it is possible to detect a clogged through hole of the NOx catalyst 75 and the level of the clog from the value of the differential pressure $\Delta P$.

The exhaust gas temperature sensor 61 is configured to detects an exhaust gas temperature T The exhaust gas temperature sensor 61 is arranged, for example, in the bypass path 31 (e.g., at an inlet port of the bypass path 31 immediately downstream of the power generation engine 25). With the exhaust gas temperature sensor 61, it is possible to detect the exhaust gas temperature T immediately after combustion in the power generation engine 25.

The ECU 93 is configured to control the power generation engine 25. The ECU 93 may be structured by, for example, a CPU, a ROM, a RAM, an HDD, and the like connected by a bus, or a single chip of an LSI and the like. The ECU 93 is capable of obtaining, for example, information of an engine rotation speed N and a fuel injection amount F.

The notification device 92 is configured to inform an operator of the status of the exhaust gas purification device 50. The notification device is provided, for example, in a control panel accommodating therein the control device 90. The notification device 92 includes a display screen configured to indicate the status of the exhaust gas purification device 50, a speaker configured to output an alarm sound, a switch for stopping the alarm, and the like.

The control device 90 controls the urea-use air valve 56, the urea water supply pump 57, the switching valve 58, the injection valve 83, the pressure control valve 84, the first on-off valve 36, the second on-off valve 37, and the like. The control device 90 stores: various programs and data for controlling the urea-use air valve 56, the urea water supply pump 57, the switching valve 58, the injection valve 83, the pressure control valve 84, the first on-off valve 36, the second on-off valve 37, and the like; a restricted area map M1 for calculating an exhaustion restricted area; an exhaust stream velocity map M2 for calculating an exhaust stream velocity based on the engine rotation speed N, the fuel injection amount F, the generator output, and the exhaust gas temperature T; and an initial differential pressure map M3 for calculating the initial differential pressure $\Delta Pi$ which is the differential pressure of the catalytic reaction unit 70 at the initial status, at each exhaust stream velocity. The control device 90 further stores a reference differential pressure increase amount map M4 and the like for calculating, for initial differential pressure $\Delta Pi$, a first reference differential pressure increase amount $\Delta Pt1$ which requires replacement of the catalyst due to deterioration over time, and a second reference differential pressure increase amount $\Delta Pt2$ which requires a soot-blow process that yields a higher cleaning effect, which is performed with a condition different from a predetermined condition of an ordinary soot-blow process.

The control device 90 may have a structure in which a CPU, a ROM, a RAM, an HDD, and the like are connected by a bus, or structure with a single chip of an LSI and the like. It should be noted that the control device 90 may be integrally structured with the ECU 93 configured to control the power generation engine 25.

The following describes an exemplary control by the control device 90.

The control device 90 is connected to a solenoid of the urea-use air valve 56, and controls opening and closing of the urea-use air valve 56. The control device 90 is connected to a drive motor of the urea water supply pump 57, and controls the operation status of the urea water supply pump 57. That is, the control device 90, by controlling the operation status of the urea water supply pump 57, can change the amount of urea water added to the exhaust gas to any given amount. The control device 90 is connected to a switching valve 58 and controls opening and closing of the switching valve 58.

The control device 90 is connected to the injection valve 83 and controls opening and closing of the injection valve 83. The control device 90 is connected to the pressure control valve 84 and controls opening and closing of the pressure control valve 84. The control device 90 is connected to the differential pressure sensor 60, and obtains a signal regarding the differential pressure $\Delta P$ detected by the differential pressure sensor 60, between the exhaust gas pressure on the upstream side and the exhaust gas pressure on the downstream side of the catalytic reaction unit 70.

The control device 90 is connected to the first on-off valve 36 and the second on-off valve 37, and controls opening and closing of the first on-off valve 36 and the second on-off valve 37. It should be noted that the control device 90 may be capable of obtaining a manual open/close signal of the first on-off valve 36 and the second on-off valve 37, and of controlling the first on-off valve 36 and the second on-off valve 37 based on the open/close signal.

The control device 90 is connected to the ECU 93, and obtains various information of the power generation engine 25, which is obtained by the ECU 93 such as the engine rotation speed N and the fuel injection amount F. Further, the control device 90 may directly obtain the various information of the power generation engine 25 without intervening the ECU 93.

The control device 90 is connected to the GPS device 91 and obtains the position detected by the GPS device 91. Further, the control device 90 may be connected to an input device (not shown) and can obtain signals regarding a targeted purification rate and concentration of the urea water, which are input through the input device. It should be noted that the control device 90 may store in advance information of the targeted purification rate and the concentration of the urea water. The control device 90 is connected to the notification device 92, and notifies the status of the exhaust gas purification device 50, and alarms a catalyst abnormality warning which indicates an abnormal deterioration of the NOx catalyst 75.

(Description on Exhaust Stream Velocity Ve, Reference Exhaust Stream Velocity Vt, Reference Value of Difference Between Differential Pressure ΔP and Initial Differential Pressure ΔPi)

Here, in the exhaust gas purification device 50, a conditions of pressurized air injection by the air injection nozzle 82 is varied based on comparison between a calculated exhaust stream velocity Ve and the reference exhaust stream velocity Vt, and the reference value of a difference between the differential pressure ΔP of the catalytic reaction unit 70 and the calculated initial differential pressure ΔPi of the catalytic reaction unit 70.

In this section, the exhaust stream velocity Ve, the reference exhaust stream velocity Vt, the reference value of the difference between the differential pressure ΔP and the initial differential pressure ΔPi are described.

Figure 6:
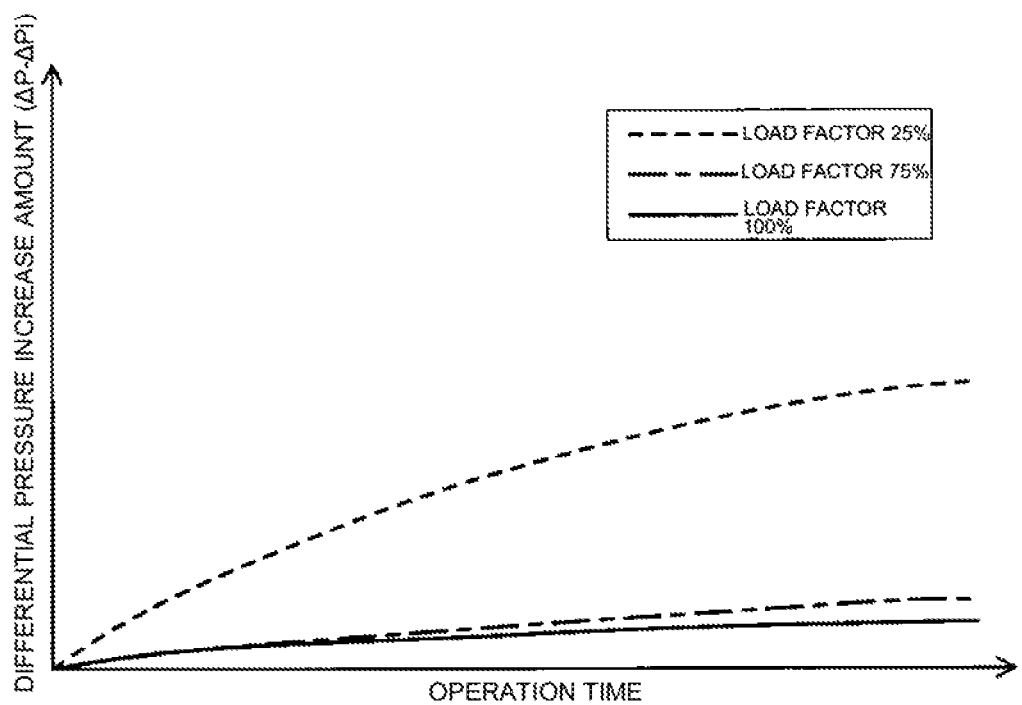
FIG. 6 A diagram showing variation over time in the differential pressure for each load factor of the exhaust gas purification device of the embodiment.
Figure 7:
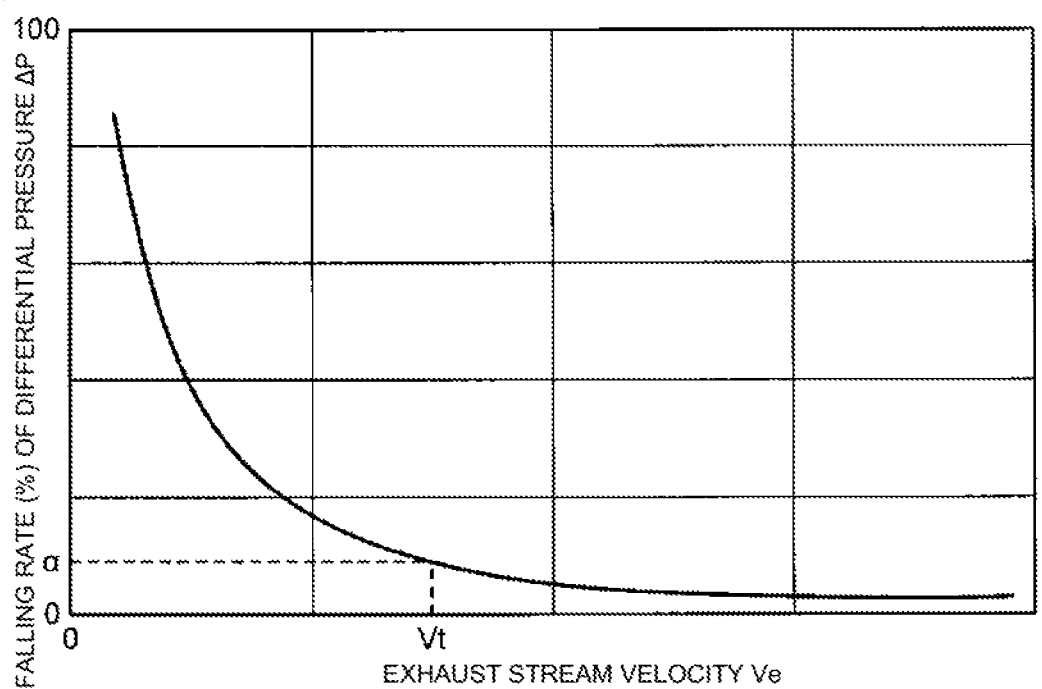
FIG. 7 A diagram showing a relation between an exhaust stream velocity and a falling rate of differential pressure, in the exhaust gas purification device of the embodiment.

First, the exhaust stream velocity Ve and the reference exhaust stream velocity Vt are described. FIG. 6 is a diagram showing variation over time in the differential pressure for each load factor of the exhaust gas purification device 50 of the embodiment. FIG. 7 is a diagram showing a relation between an exhaust stream velocity and a falling rate of differential pressure, in the exhaust gas purification device 50 of the embodiment.

As shown in FIG. 6, in cases where the power generation engine 25 is operated at a predetermined engine rotation speed N, with a load factor of 100% and a load factor of 75%, the differential pressure increase amount (ΔP−ΔPi) of the catalytic reaction unit 70 gradually increases with respect to elapse of the operation time.

On the other hand, in cases where the power generation engine 25 is operated at a predetermined engine rotation speed N, with a load factor of 25%, the differential pressure increase amount (ΔP−ΔPi) of the catalytic reaction unit 70 rapidly increases as compared to the cases of operation with the load factor of 100% and the load factor of 75%. Here, the differential pressure ΔP of the catalytic reaction unit 70 increases when the soot adheres to the NOx catalyst 75, clogging the NOx catalyst 75.

That is, the lower the load factor Wr of the power generation engine 25 is, the easier the soot adheres to the NOx catalyst 75. This is because the exhaust stream velocity Ve lowers when the load factor Wr of the power generation engine 25 is low, which leads to a decrease in the amount of soot removed by the discharging force from the NOx catalyst 75.

Therefore, in the exhaust gas purification device 50, the slower the exhaust stream velocity Ve (lower the load factor Wr), the greater the falling rate of the differential pressure ΔP of the catalytic reaction unit 70 becomes by removing the soot from the NOx catalyst 75 through the soot-blow process, as shown in FIG. 7. Therefore, in the exhaust gas purification device 50, the soot can be efficiently removed by implementing the soot-blow process, when the exhaust stream velocity Ve is not more than the reference exhaust stream velocity Vt at which the falling rate a of the differential pressure ΔP of the catalytic reaction unit 70 becomes a predetermined value or higher by the soot-blow process. As described, by setting the reference exhaust stream velocity Vt, the exhaust stream velocity Ve for implementing the soot-blow process can be determined.

Next, the reference value of the difference between the differential pressure ΔP of the catalytic reaction unit 70 and the calculated initial differential pressure ΔPi of the catalytic reaction unit 70 is described.

Figure 8:
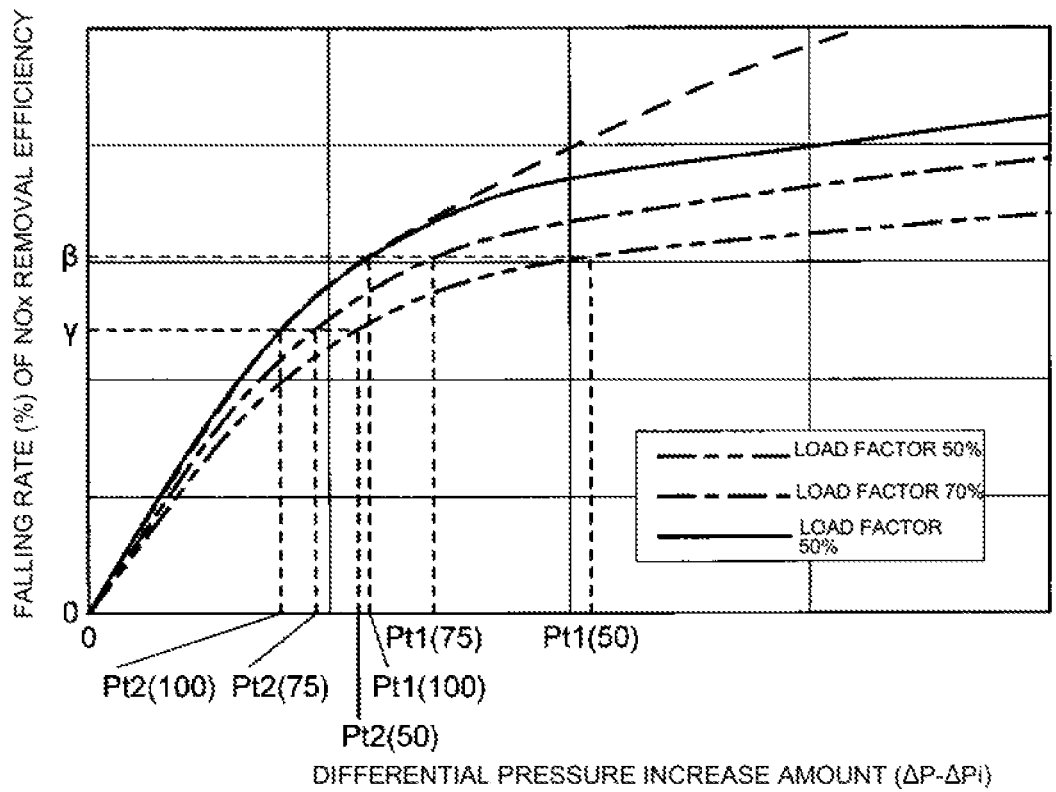
FIG. 8 A diagram showing a relation between a differential pressure increase amount and the falling rate of the NOx removal efficiency, in the exhaust gas purification device of the embodiment.
Figure 9:
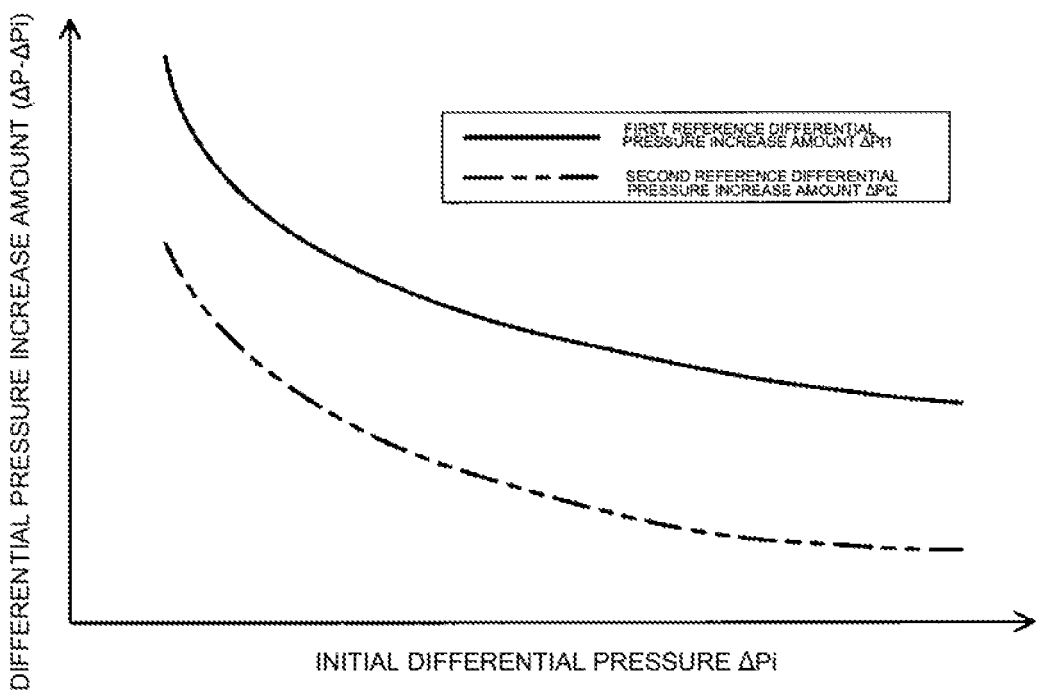
FIG. 9 A diagram showing the reference differential pressure increase amount at each initial differential pressure, in the exhaust gas purification device of the embodiment.

FIG. 8 is a diagram showing a relation between a differential pressure increase amount and the falling rate of the NOx removal efficiency, in the exhaust gas purification device 50 of the embodiment. FIG. 9 is a diagram showing the reference differential pressure increase amount at each initial differential pressure, in the exhaust gas purification device 50 of the embodiment. It should be noted that FIG. 8 shows the increase amount of the differential pressure ΔP and the falling rate of the NOx removal efficiency with the load factors Wr, at a predetermined engine rotation speed N. FIG. 9 is a reference differential pressure increase amount map M4 indicating the first reference differential pressure increase amount ΔPt1 and the second reference differential pressure increase amount ΔPt2 for each initial differential pressure ΔPi.

In the exhaust gas purification device 50, residual soot is deposited on the NOx catalyst 75 through long-term operations, irrespective of the load factor of the power generation engine 25. Due to this, a difference between the initial differential pressure ΔPi and the current differential pressure ΔP of the catalytic reaction unit 70 increases while the NOx removal efficiency drops, as shown in FIG. 8. Given this, in the exhaust gas purification device 50, the amount of fall in the NOx removal efficiency is estimated from the difference between the initial differential pressure ΔPi and the current differential pressure ΔP of the catalytic reaction unit 70 at a given exhaust stream velocity Ve.

Thus, in the exhaust gas purification device 50, replacement of the catalyst and a manual cleaning are performed, when the differential pressure increase amount is determined as to be equal to or higher than the first reference differential pressure increase amount ΔPt1 which is the reference value of the difference between the initial differential pressure ΔPi and the current differential pressure ΔP of the catalytic reaction unit 70, at which reference value the falling rate of the NOx removal efficiency with a given load factor Wr is a predetermined value β or higher. This way, a drop in the NOx removal efficiency of the NOx catalyst 75 can be restrained even through long-term operations.

Further, in the exhaust gas purification device 50, a soot-blow process (cleaning mode) that yields a higher cleaning effect than the ordinary soot-blow process (standard mode) is performed, when the differential pressure increase amount is determined as to be equal to or higher than the second reference differential pressure increase amount ΔPt2 which is the reference value of the difference between the initial differential pressure ΔPi and the current differential pressure ΔP of the catalytic reaction unit 70, at which reference value the falling rate of the NOx removal efficiency with a given load factor Wr is a predetermined value γ or higher. This way, a drop in the NOx removal efficiency of the NOx catalyst 75 can be restrained even through long-term operations.

It should be noted that, in cases where the exhaust gas purification device 50 includes an NOx concentration sensor and the like, for example, an abnormal deterioration (indicated by broken line in FIG. 8) of the NOx catalyst 75 can be detected by comparing the falling rate of the NOx removal efficiency calculated from the differential pressure increase amount with the NOx concentration obtained, for a given load factor Wr.

Therefore, in the exhaust gas purification device 50, the control mode of the soot-blower unit 80 is determined from the initial differential pressure ΔPi and the differential pressure increase amount (ΔP−ΔPi), based on the reference differential pressure increase amount map M4 (see FIG. 9) which defines, for each initial differential pressure ΔPi, the first reference differential pressure increase amount ΔPt1 at which replacement and the like is required due to deterioration over time of the NOx catalyst 75, and the second reference differential pressure increase amount ΔPt2 at which the soot-blow process that yields higher cleaning effect than the ordinary soot-blow process is required.

(Description of Sequence in the Soot-Blower Unit 80)

Next, the following describes a sequence in the soot-blower unit 80 of the exhaust gas purification device 50.

Figure 10:
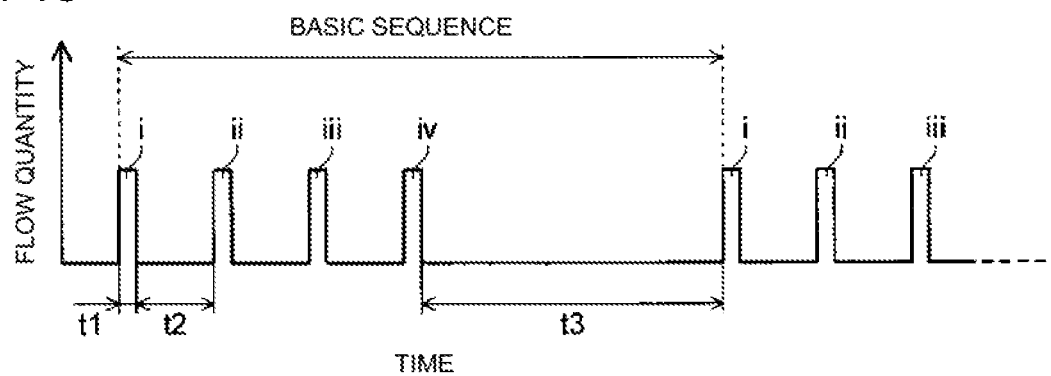
FIG. 10 A diagram showing a pressurized air injection sequence of a standard mode, in the exhaust gas purification device of the embodiment.
Figure 11:
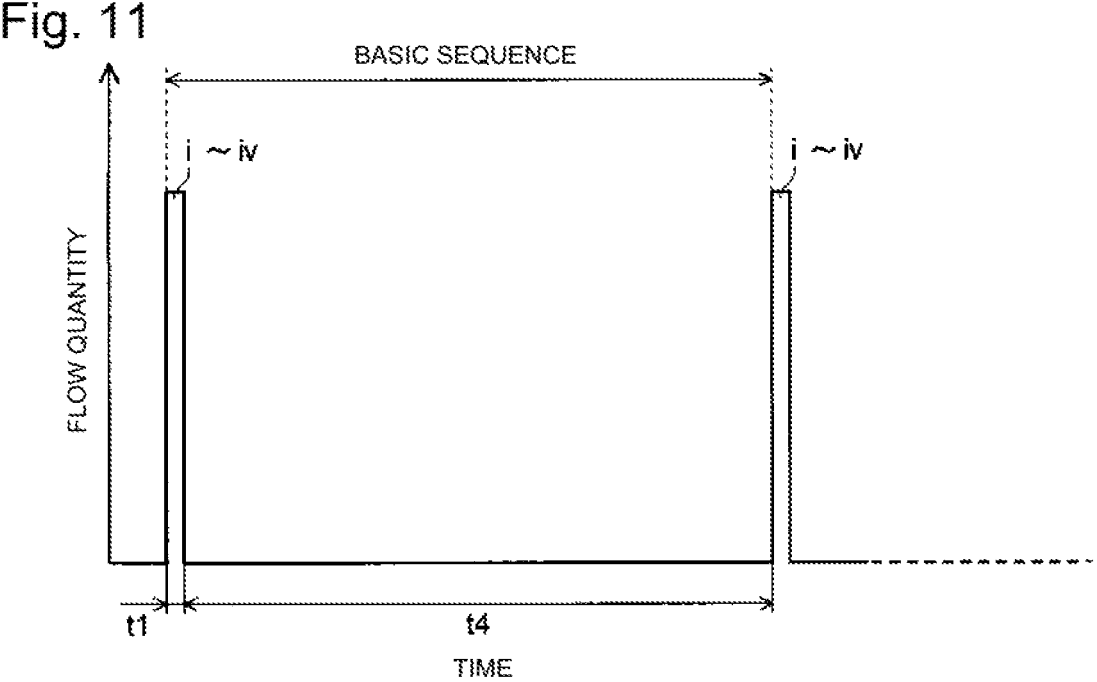
FIG. 11 A diagram showing a pressurized air injection sequence of a standard mode, in a traditional exhaust gas purification device.

FIG. 10 is a diagram showing a pressurized air injection sequence of a standard mode, in the exhaust gas purification device 50 of the embodiment. FIG. 11 is a diagram showing a pressurized air injection sequence of a standard mode, in a traditional exhaust gas purification device. In FIGS. 10 and 11, the transverse axis represents the time, and the vertical axis represents the flow quantity of pressurized air injected.

It should be noted that FIG. 10 and FIG. 11 shows the injection sequence of a case of having four air injection nozzles 82. Further, in FIG. 10 and FIG. 11, the four air injection nozzles 82 are given numbers i to iv, respectively, so as to clarify the injection is from which one of the air injection nozzles 82. For example, in FIG. 10, pressurized air injection given the number i indicates injection from the air injection nozzle 82 given the number i.

On the other hand, in the traditional injection sequence shown in FIG. 11 for comparison, the indication is "i to iv" because pressurized air is injected at the same time from the four air injection nozzles. It should be noted that the air injection nozzles for the traditional injection sequence are the same as the air injection nozzles 82 of the exhaust gas purification device 50 of the embodiment. Further, the flow quantity of pressurized air injected from a single air injection nozzle is the same both in the traditional injection sequence and that of the present embodiment.

The injection sequence of the standard mode is executed when the differential pressure increase amount (ΔP−ΔPi) is smaller than the first reference differential pressure increase amount ΔPt1 and the second reference differential pressure increase amount ΔPt2, and when the exhaust stream velocity Ve is smaller than the reference exhaust stream velocity Vt.

As shown in FIG. 10, in the injection sequence in the exhaust gas purification device 50 of the embodiment, the air injection nozzles 82 successively inject one by one an equal flow quantity of pressurized air for a period t1 at intervals of period t2. That is, the air injection nozzles 82 do not inject pressurized air at the same time. For example, after one air injection nozzle 82 injects pressurized air, a different one of the air injection nozzles 82 injects pressurized air, after an interval of period t2.

Then, after the last one of the air injection nozzles 82 (the air injection nozzle 82 of iv in this example) injects pressurized air, there will be no injection of pressurized air from any of the air injection nozzles 82 for a period t3. Then, after elapse of the period t3, the air injection nozzles 82 again successively inject one by one an equal flow quantity of pressurized air for a period t1 at intervals of period t2.

From the start of injection from the first one of the air injection nozzles 82 (the air injection nozzle 82 of i in this example) to elapse of the period t3 is referred to as basic sequence. This basic sequence is started after the exhaust gas starts flowing in the exhaust gas purification device 50, or after the power generation engine 25 is activated, and is repetitively executed while the above-described condition of the standard mode is satisfied. That is, the basic sequence is repetitively executed, irrespective of the amount of soot deposited on the NOx catalyst 75, as long as the above-described condition of the standard mode is satisfied.

Here, the period t1 which is the duration of pressurized air injection from each air injection nozzle 82 is 0.1 to 0.5 second. The period t1 is set to this range to maintain the consumption amount of the pressurized air to a minimum amount, and to form impulse waves effective for removing the soot.

The period t2 is sufficient if it is 30 seconds to 5 minutes, and is approximately 1 minute, for example. It should be noted that the period t2 is not limited to this. For example, the period t2 is set to a desired time, based on the time and the like taken before the pressure of the air tank 55 (reserve tank 81) rises up to a predetermined pressure after injection of pressurized air from one of the air injection nozzles 82.

The period t3 is sufficient if it is 20 minutes or longer, and is for example approximately 30 minutes. It should be noted that the period t3 is not limited to this. The period t3 is set based on the deposition amount of the soot on the NOx catalyst 75, i.e., the above-described differential pressure increase amount (ΔP−ΔPi).

Here, the above-described differential pressure increase amount (ΔP−ΔPi) becomes "0", when the basic sequence is executed once in the standard mode. Then, for the period t3 in which no pressurized air is injected from any of the air injection nozzles 82, the soot is deposited on the NOx catalyst 75 and the differential pressure increase amount (ΔP−ΔPi) is increased. It is preferable that the differential pressure increase amount (ΔP−ΔPi) be made "0" with a single basic sequence, even after the period t3. For this reason, the period t3 is preferably set, for example, to a period not longer than a period such that the differential pressure increase amount (ΔP−ΔPi) can be made "0" with a single basic sequence.

On the other hand, as shown in FIG. 11, the injection sequence in a traditional exhaust gas purification device, the four air injection nozzles inject pressurized air at the same time. At this time, the four air injection nozzles each injects an equal flow quantity of pressurized air. Therefore, the flow quantity of pressurized air injected in the period t1 is a quadruple of the flow quantity of pressurized air injected from a single air injection nozzle 82 shown in FIG. 10. Further, in the traditional injection sequence, after injection of the pressurized air, i.e., after the period t1, there is a period t4 in which no pressurized air is injected from any of the air injection nozzles. In the traditional injection sequence, the period t1 and the period t4 constitutes a basic sequence.

It should be noted that the total flow quantity of pressurized air injected in the basic sequence of the embodiment is the same total flow quantity of pressurized air injected in the traditional basic sequence.

When the passage cross section of the catalytic reaction unit 70 in the casing part 74 is constant, the total flow quantity of pressurized air injected in a single basic sequence is constant. Therefore, for example, by increasing the number of the air injection nozzles 82, the flow quantity of pressurized air injected by a single air injection nozzle 82 in the period t1 can be reduced. That is, the flow quantity of pressurized air injected by a single air injection nozzle 82 varies according to the number of air injection nozzles 82 arranged.

Table 1 shows, for different number of air injection nozzles, specifications at a time of executing the injection sequence in the exhaust gas purification device 50 of the embodiment and the injection sequence in the traditional exhaust gas purification device. The table shows specification for cases of using two, three, and four air injection nozzles.

It should be noted that, in Table 1, the area of the passage cross section of the catalytic reaction unit 70 in the casing part 74 with two air injection nozzles is 1 A, and is indicated in an area ratio. For example, the area of the passage cross section of the catalytic reaction unit 70 in the casing part 74 with four air injection nozzles is 2.8 times (2.8 A) of the area of the passage cross section with two air injection nozzles. Further, for the numbers of air injection nozzles, the flow quantities of pressurized air of the embodiment in the period t1 are $1M_1$, $1M_2$, and $1M_3$, respectively, and the flow quantities of pressurized air of the traditional mode in the period t1 are indicated in flow quantity ratios. For example, when two air injection nozzles are provided, the flow quantity of pressurized air of the traditional mode in the period t1 is a double ($2M_1$) of the flow quantity ($1M_1$) of pressurized air of the embodiment in the period t1.

TABLE 1

| | | | | |
|---|---|---|---|---|
| Area ratio of passage cross section of catalytic reaction unit in casing | | 1 A | 1.8 A | 2.8 A |
| Number of air injection nozzles | | 2 | 3 | 4 |
| Injection sequence of embodiment | Blow pipe diameter (nominal diameter) | 50 A | 50 A | 50 A |
| | Flow quantity ratio of pressurized air in period t1 | $1M_1$ | $1M_2$ | $1M_3$ |
| Traditional injection sequence | Blow pipe diameter (nominal diameter) | 50 A | 80 A | 100 A |
| | Flow quantity ratio of pressurized air in period t1 | $2M_1$ | $3M_2$ | $4M_3$ |

As shown in Table 1, in the injection sequence of the embodiment, the flow quantity of pressurized air injected once (one period t1) is less than that of the traditional injection sequence, because the air injection nozzles 82 successively inject one by one an equal flow quantity of pressurized air. Therefore, the diameter (nominal diameter) of the blow pipe 85a in the embodiment can be made smaller than the diameter (nominal diameter) of the traditional blow pipe. This enables reduction of the space for installing the pipe. Further, since a pipe with a smaller nominal diameter than the traditional one can be used, the manufacturing costs can be reduced.

Further, since the flow quantity of pressurized air injected each time in the injection sequence of the embodiment is less than that of the traditional injection sequence, the load of the pressurized air supply pump 54 can be reduced. This way downsizing and the like of the pressurized air supply pump 54 is possible. Further, the capacity of the air tank 55 (reserve tank 81) can be reduced.

It should be noted that, for example, the number of air injection nozzles 82 can be increased with an increase in the area of the passage cross section of the catalytic reaction unit 70 in the casing part 74. Further, if the area of the passage cross section of the catalytic reaction unit 70 in the casing part 74 is constant, the flow quantity of pressurized air injected by a single air injection nozzle 82 in the period t1 can be reduced by increasing the number of the air injection nozzles 82, as hereinabove described. For example, where the area of the passage cross section in Table 1 is 1 A, the flow quantity of pressurized air injected from a single air injection nozzle 82 in the period t1 is made $½M_1$, with four air injection nozzles 82.

(Description of Instantaneous Pressurizing Injection Method in Soot-Blower Unit 80) The following describes an instantaneous pressurization which is an injection method of pressurized air in a soot-blower unit 80 of the exhaust gas purification device 50 of the embodiment.

Figure 12:
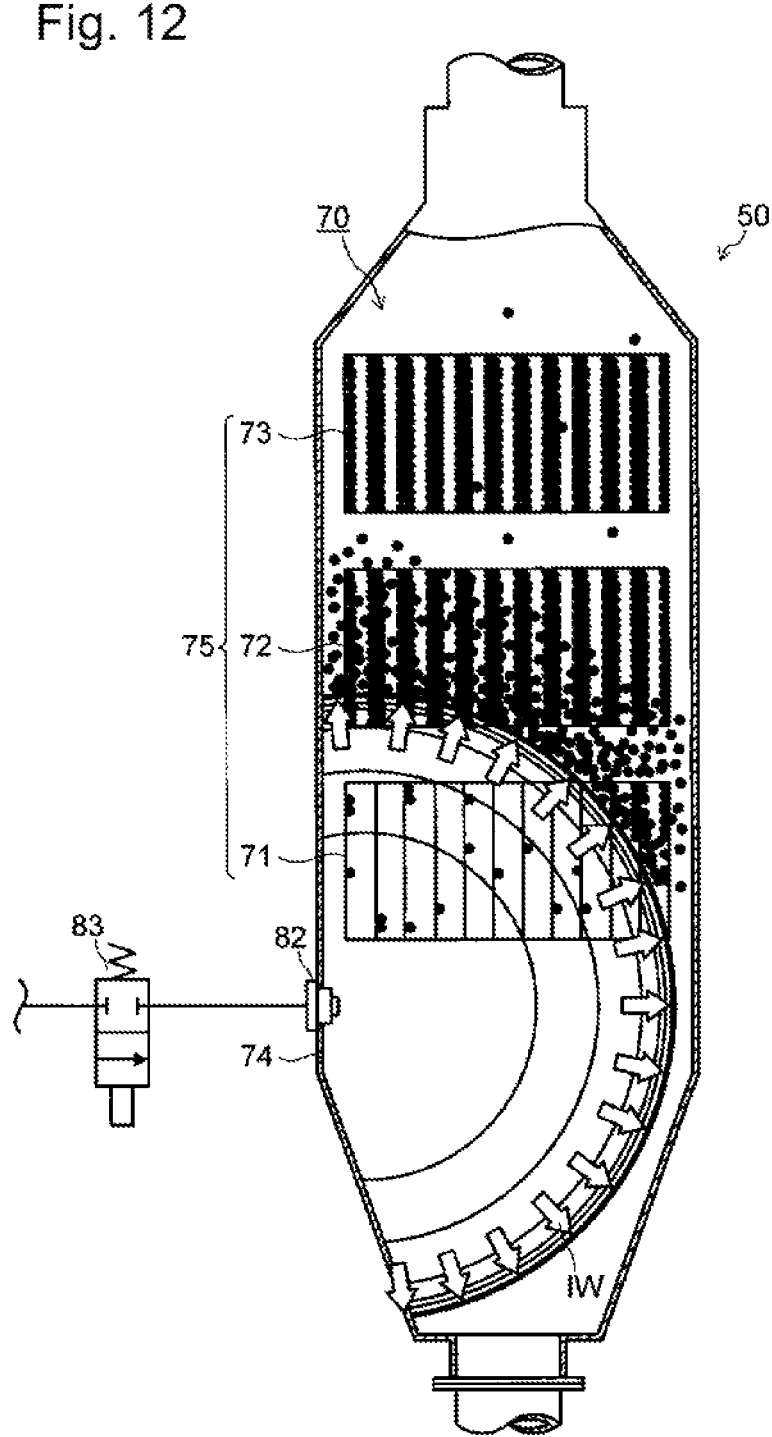
FIG. 12 A conceptual diagram showing a mode of a soot-blow process in a catalytic reaction unit, in the exhaust gas purification device of the embodiment.
Figure 13:
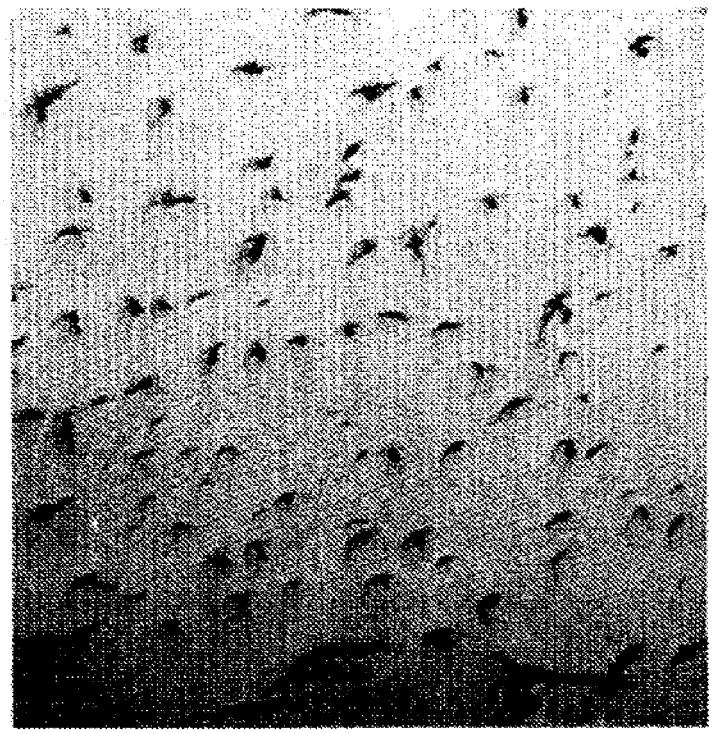
FIG. 13 A diagram showing a picture of an NOx catalyst to which soot is adhered, in the exhaust gas purification device of the embodiment.
Figure 14:
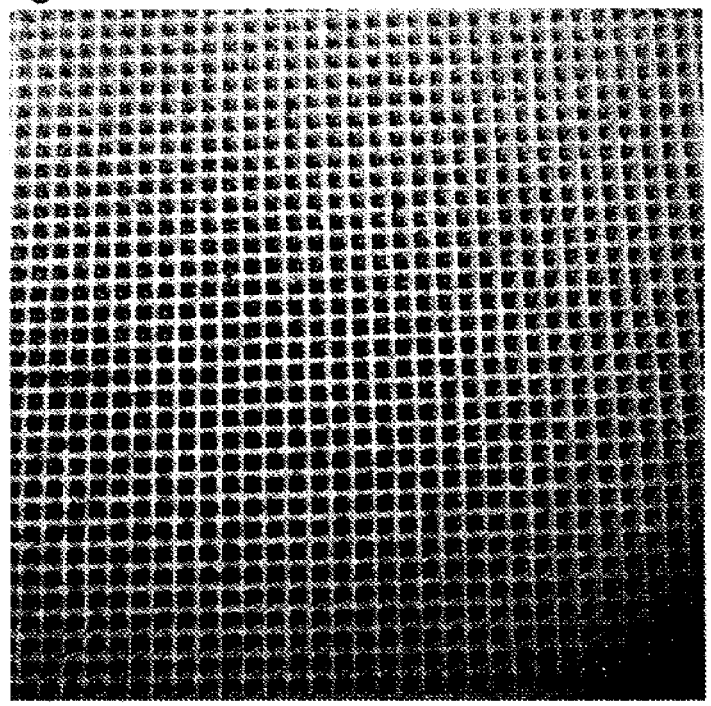
FIG. 14 A diagram showing a picture of an NOx catalyst, after a basic sequence of the standard mode is performed once, in the exhaust gas purification device of the embodiment.

FIG. 12 is a conceptual diagram showing a mode of a soot-blow process in a catalytic reaction unit 70, in the exhaust gas purification device 50 of the embodiment. FIG. 13 is a diagram showing a picture of an NOx catalyst 75 to which soot is adhered, in the exhaust gas purification device 50 of the embodiment. FIG. 14 is a diagram showing a picture of the NOx catalyst 75, after the basic sequence of the standard mode is performed once, in the exhaust gas purification device 50 of the embodiment. Further, FIG. 14 is a diagram showing a state after the basic sequence of the standard mode is performed once to the NOx catalyst 75 shown in FIG. 13.

Figure 15:
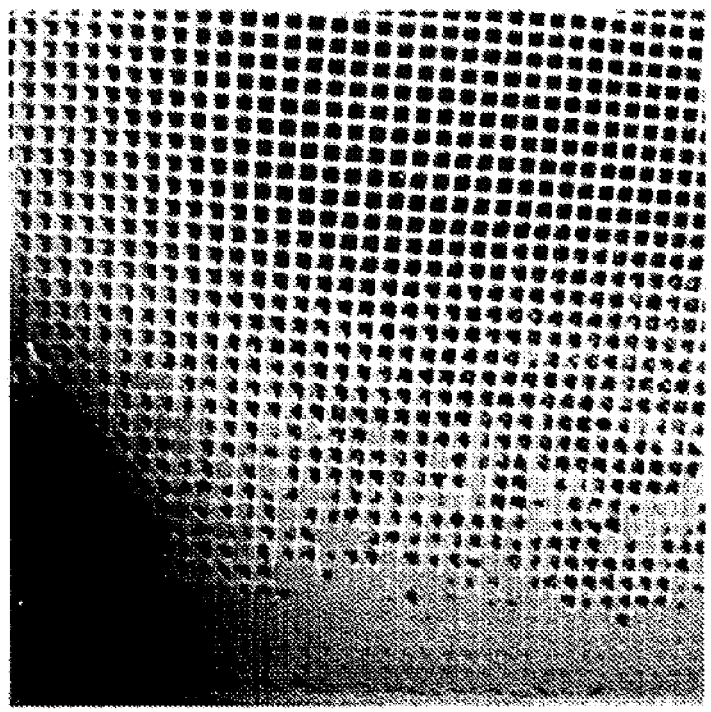
FIG. 15 A conceptual diagram showing a picture of an NOx catalyst, after a traditional soot-blow process is performed, in the traditional exhaust gas purification device.

Further, FIG. 15 is a conceptual diagram showing a picture of the NOx catalyst, after a traditional soot-blow process is performed, in the traditional exhaust gas purification device. Further, FIG. 15 is a diagram showing a state after the traditional soot-blow process is performed to the NOx catalyst shown in FIG. 13.

It should be noted that FIG. 13 to FIG. 15 show an end surface on the upstream side of the uppermost stream NOx catalyst.

In the exhaust gas purification device 50 of the embodiment, pressurized air is supplied by the soot-blower unit 80 for the period t1 into the casing part 74 of the catalytic reaction unit 70, whose inner pressure is a pressure P. At this time, the pressurized air is supplied so that the pressure (P+ΔIP) in the casing part 74 after the supply is a predetermined value x or higher as shown in the following formula (1), and that the pressure increasing rate per unit time ΔIP/t1 is a predetermined value y or higher as shown in the following formula (2). It should be noted that the period t1 is as described with reference to FIG. 10.

$(P+\Delta IP) \geq x$    Formula (1)

$\Delta IP/t1 \geq y$    Formula (2)

This generates an impulse wave IW due to a rapid pressure increase in the casing part 74, as shown in FIG. 12. This impulse wave IW spherically propagates from the air injection nozzle 82 to the inside of the casing part 74, with the exhaust gas in the casing part 74 as the medium. Since the exhaust gas is filled inside the casing part 74, the impulse wave IW propagates from the air injection nozzle 82 to all the directions in the casing part 74, irrespective of the direction and the position of the air injection nozzle 82 in the casing part 74. That is, the impulse wave IW reaches the entire surface of the NOx catalyst 75 which is in contact with the exhaust gas in the casing part 74.

Thus, in the exhaust gas purification device 50 of the embodiment adopting an instantaneous pressurizing method, a force stemming from the impulse wave IW equally acts on the soot adhered to the surface of the NOx catalyst 75 which contacts with the exhaust gas in the casing part 74. This way, the soot adhered to the NOx catalyst 75 shown in FIG. 13 in general is removed evenly by the act of the force of the impulse wave IW as shown in FIG. 14. Further, in cases where a plurality of NOx catalysts are arranged in the direction of the flow of the exhaust gas, there is no need to provide an air injection nozzle 82 between every NOx catalysts, and the soot adhered to the NOx catalysts in general can be removed evenly with a provision of the air injection nozzle 82 on the upstream side of the first NOx catalyst 71 at the uppermost stream.

As described, in the exhaust gas purification device 50 of the embodiment adopting the instantaneous pressurizing method, the soot can be removed by action of the force of the impulse wave IW.

On the other hand, in a traditional soot-blow process that removes soot by causing the pressurized air to hit the NOx catalyst, the pressurized air acts on only the soot adhered to the NOx catalyst where the pressurized air hits. Therefore, as shown in FIG. 15, the pressurized air does not act on the soot adhered to a part of the NOx catalyst, not included in the injection range of the pressurized air, and the soot therefore is not removed (clogged parts in FIG. 15).

(Description of Soot-Blow Control in Exhaust Gas Purification Device 50)

Figure 16:
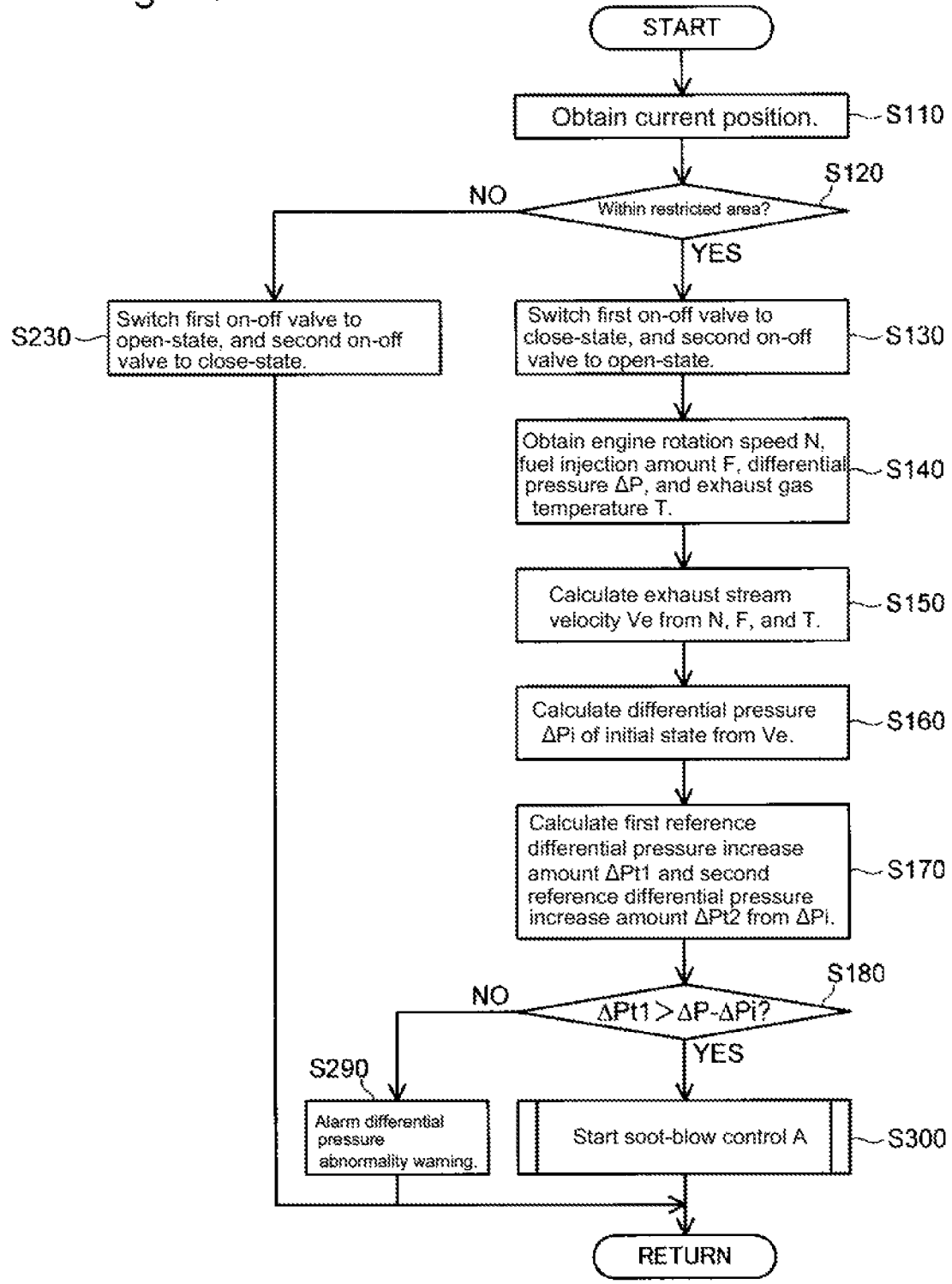
FIG. 16 A flowchart explaining a soot-blow control in a soot-blower unit of the exhaust gas purification device of the embodiment.
Figure 17:
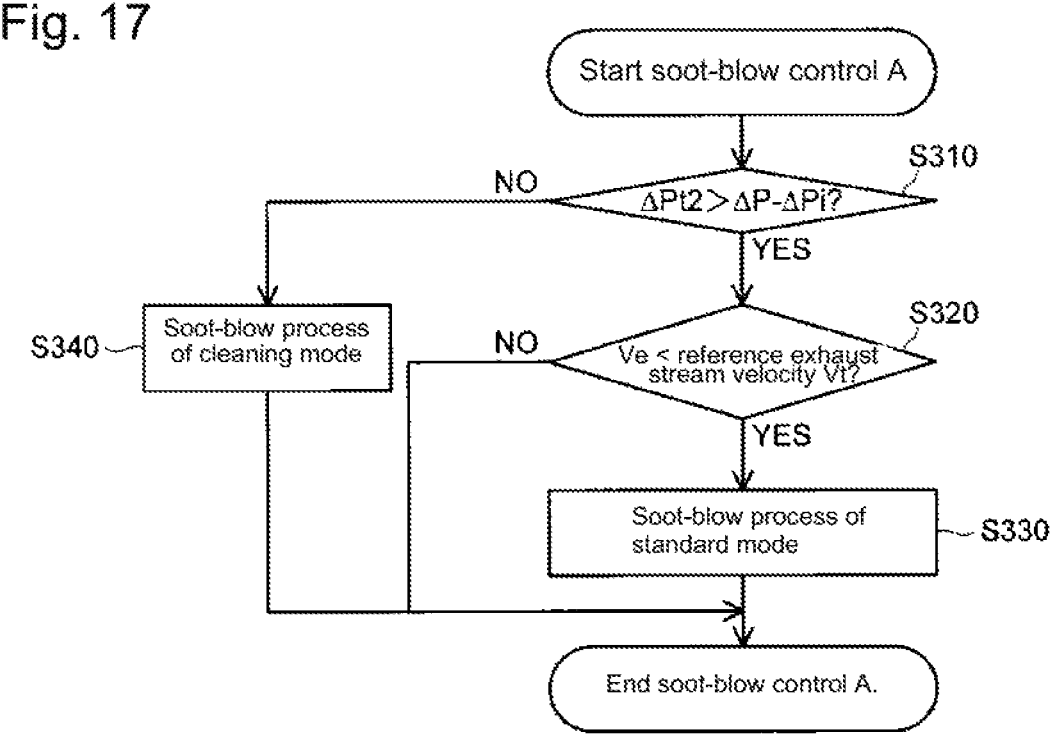
FIG. 17 A flowchart explaining a soot-blow control in a soot-blower unit of the exhaust gas purification device of the embodiment.

Next, the following describes with reference to FIG. 3, FIG. 16 and FIG. 17, a soot-blow control in the soot-blower unit 80 of the exhaust gas purification device 50 of the embodiment.

FIG. 16 and FIG. 17 are each a flowchart explaining a soot-blow control in the soot-blower unit 80 of the exhaust gas purification device 50 of the embodiment. It should be noted that the following description deals with an example where the exhaust gas purification device 50 is built in a ship.

First, an operation overview of the soot-blower unit 80 in the exhaust gas purification device 50 is described.

The control device 90 starts the soot-blow control, when the current position of the ship having the exhaust gas purification device 50 built therein is within an exhaust gas restricted area, and when the difference between the differential pressure ΔP of the catalytic reaction unit 70 and the calculated initial differential pressure ΔPi of the catalytic reaction unit 70 is smaller than the first reference differential pressure increase amount ΔPt1. It should be noted that the soot-blow control includes the standard mode which performs an ordinary soot-blow process, and a cleaning mode which performs a soot-blow process that yields a higher cleaning effect than the standard mode.

On the other hand, the control device 90 alarms a differential pressure abnormality warning, in cases where the difference between the differential pressure ΔP of the catalytic reaction unit 70 and the calculated initial differential pressure ΔPi of the catalytic reaction unit 70 is equal to or higher than the first reference differential pressure increase amount ΔPt1.

In the soot-blow control, the control device 90 performs a soot-blow process of the standard mode, when the difference between the differential pressure ΔP of the catalytic reaction unit 70 and the calculated initial differential pressure ΔPi of the catalytic reaction unit 70 is smaller than the second reference differential pressure increase amount ΔPt2, and the calculated exhaust stream velocity Ve is smaller than the reference exhaust stream velocity Vt.

On the other hand, the control device 90 performs a soot-blow process of the cleaning mode, when the difference between the differential pressure ΔP of the catalytic reaction unit 70 and the calculated initial differential pressure ΔPi of the catalytic reaction unit 70 is equal to or higher than the second reference differential pressure increase amount ΔPt2. Further, the control device 90 does not perform the soot-blow process when the calculated exhaust stream velocity Ve is equal to or higher than the reference exhaust stream velocity Vt.

Here, in the injection sequence of the cleaning mode, the air injection nozzles 82 successively inject one by one an equal flow quantity of pressurized air for a period t1 at intervals of period t2, as in the case of the standard mode. At this time, the blow pressure of the cleaning mode is, for example, set higher (e.g., 0.8 MPa) than the blow pressure of the standard mode (e.g. 0.5 MPa) Further, the period t2 (see FIG. 10) of the cleaning mode may be made shorter than the period t2 of the standard mode, taking into account the recovery of the pressure of the air tank 55 (reserve tank 81). Further, the period t3 (see FIG. 10) of the cleaning mode may be made shorter than the period t3 of the standard mode, taking into account the deposition amount of the soot.

Next, the following describes the soot-blow control in the soot-blower unit 80 of the exhaust gas purification device 50 of the embodiment. It should be noted that the control device 90 performs the soot-blow control for example, in association with starting and stopping of the power generation engine 25.

As shown in FIG. 16, the control device 90 obtains the current position of the ship which is detected by the GPS device 91 (step S110).

Subsequently, the control device 90 determines whether or not the current position of the ship obtained is within a restricted area based on the restricted area map M1 (step S120).

In the determination of step S120, if the current position of the ship obtained is determined as not to be within a restricted area (No in step S120), the control device 90 switches the first on-off valve 36 to the open-state, and switches the second on-off valve 37 to the close-state (step S230). Then, the control device 90 executes step S110. It should be noted that, in this case, the exhaust gas is discharged into the atmosphere without passing through the exhaust gas purification device 50.

On the other hand, in the determination of step S120, if the current position of the ship obtained is determined as to be within a restricted area (Yes in step S120), the control device 90 switches the first on-off valve 36 to the close-state, and switches the second on-off valve 37 to the open-state (step S130). It should be noted that, in this case, the exhaust gas is discharged into the atmosphere after being purified by the exhaust gas purification device 50.

Subsequently, the control device 90 obtains, from the ECU 93, the engine rotation speed N, the fuel injection amount F, and the generator output, obtains the differential pressure ΔP of the catalytic reaction unit 70 from the differential pressure sensor 60, and obtains the exhaust gas temperature T from the exhaust gas temperature sensor 61 (step S140).

Subsequently, the control device 90 calculates the exhaust stream velocity Ve from the engine rotation speed N, the fuel injection amount F, and the exhaust gas temperature T obtained, based on the exhaust stream velocity map M2 (step S150).

Subsequently, from the calculated exhaust stream velocity Ve, the control device 90 calculates the initial differential pressure ΔPi of the catalytic reaction unit 70 in relation to the exhaust stream velocity Ve, based on the initial differential pressure map M3 (step S160).

Subsequently, from the calculated ΔPi, the control device 90 calculates the first reference differential pressure increase amount ΔPt1 at which replacement and the like of the catalyst is required due to over-time deterioration of the catalyst, and the second reference differential pressure increase amount ΔPt2 at which processing in the cleaning mode is required, based on the reference differential pressure increase amount map M4 (step S170).

Subsequently, the control device 90 determines whether a difference between the differential pressure ΔP of the catalytic reaction unit 70 and the calculated initial differential pressure ΔPi of the catalytic reaction unit 70 is smaller than the calculated first reference differential pressure increase amount ΔPt1 (step S180).

In the determination of step S180, if the difference between the differential pressure ΔP and the initial differential pressure ΔPi is determined as to be smaller than the first reference differential pressure increase amount ΔPt1 (Yes in step S180), the control device 90 starts a soot-blow control A (step S300).

On the other hand, in the determination of step S180, if the difference between the differential pressure ΔP and the initial differential pressure ΔPi is determined as not to be smaller than the first reference differential pressure increase amount ΔPt1 (the difference between the differential pressure ΔP and the initial differential pressure ΔPi is determined as to be equal to or higher than the first reference differential pressure increase amount ΔPt1) (No in step S180), the control device 90 causes the notification device 92 to alarm a differential pressure abnormality warning (step S290). Then, after completion of alarming the differential pressure abnormality warning, the control device 90 executes step S110.

Next, step S300 which is the soot-blow control A is described.

As shown in FIG. 17, the control device 90 determines whether or not the obtained difference between the differential pressure ΔP of the catalytic reaction unit 70 and the calculated initial differential pressure ΔPi of the catalytic reaction unit 70 is smaller than the calculated second reference differential pressure increase amount ΔPt2 (step S310).

In the determination of step S310, if the difference between the differential pressure ΔP and the initial differential pressure ΔPi is determined as not to be smaller than the second reference differential pressure increase amount ΔPt2 (the difference between the differential pressure ΔP and the initial differential pressure ΔPi is determined as to be equal to or higher than the second reference differential pressure increase amount ΔPt2) (No in step S310), the control device 90 performs the soot-blow process of the cleaning mode (step S340). Then, the control device 90 ends the soot-blow control A and executes step S110 (see FIG. 16).

On the other hand, in the determination of step S310, if the difference between the differential pressure ΔP and the initial differential pressure ΔPi is determined as to be smaller than the second reference differential pressure increase amount ΔPt2 (Yes in step S310), the control device 90 determines whether or not the calculated exhaust stream velocity Ve is smaller than the reference exhaust stream velocity Vt (step S320).

In the determination of step S320, if the exhaust stream velocity Ve is determined as not to be smaller than the reference exhaust stream velocity Vt (the exhaust stream velocity Ve is determined as to be equal to or higher than the reference exhaust stream velocity Vt) (No in step S320), the control device 90 ends the soot-blow control A and executes step S110 (see FIG. 16).

On the other hand, in the determination of step S320, if the exhaust stream velocity Ve is determined as to be smaller than the reference exhaust stream velocity Vt (Yes in step S320), the control device 90 performs the soot-blow process of the standard mode (step S330). Then, the control device 90 ends the soot-blow control A and executes step S110 (see FIG. 16). It should be noted that the injection sequence of the standard mode is as described with reference to FIG. 10.

As hereinabove described, in the exhaust gas purification device 50 of the embodiment, a plurality of air injection nozzles 82 are provided, and the air injection nozzles 82 successively inject one by one an equal flow quantity of pressurized air to enable removal of soot adhered to the surface of the NOx catalyst. Therefore, the flow quantity of pressurized air injected each time can be made less than that of the traditional injection sequence which injects an equal flow quantity of pressurized air from each of the plurality of air injection nozzles at the same time. Therefore, the diameter (nominal diameter) of the blow pipe 85a in the embodiment can be made smaller than the diameter (nominal diameter) of the traditional blow pipe. This enables reduction of the space for installing the pipe. Further, the manufacturing costs can be reduced.

In the injection sequence in the exhaust gas purification device 50 of the embodiment, the flow quantity of pressurized air injected each time is less than the injection sequence of the traditional exhaust gas purification device 50. Therefore, the load of the pressurized air supply pump 54 can be reduced. This way downsizing, reduction of the capacity, and the like of the pressurized air supply pump 54 is possible. Further, the capacity of the air tank 55 (reserve tank 81) can be reduced.

The exhaust gas purification device 50 of the embodiment can cause the force of the impulse wave IW to act throughout the surface of the NOx catalyst 75 in contact with the exhaust gas, by propagating, with the exhaust gas as the medium, the impulse wave IW utilizing the pressurized air. That is, the soot is evenly removed from the NOx catalyst 75 by fluctuation in the pressure in the catalytic reaction unit 70. This way, the exhaust gas purification device 50 can restore the initial states of the purification rate (NOx removal efficiency) and the differential pressure ΔP of the NOx catalyst 75.

In the exhaust gas purification device 50 of the embodiment, the soot-blow process is performed in the mode that can efficiently remove the soot, based on the operation status of the power generation engine 25. This way, the exhaust gas purification device 50 can achieve both an improved removal rate of the soot by the soot-blow process, and restraining of the amount of pressurized air used in the soot-blow process.

In cases where a plurality of NOx catalysts are arranged in the direction of the flow of the exhaust gas, in the exhaust gas purification device 50 of the embodiment, there is no need to provide an air injection nozzle 82 between every NOx catalysts, and the soot adhered to the NOx catalysts 75 in general can be removed evenly with a provision of the air injection nozzle 82 on the upstream side of the first NOx catalyst 71 at the uppermost stream. Therefore, the total number of air injection nozzles 82 can be reduced.

In the exhaust gas purification device 50 of the embodiment, deposition of residual soot on the NOx catalyst 75 over time can be estimated based on an increase in the differential pressure $\Delta P$ of the catalytic reaction unit 70. Further, the exhaust gas purification device 50 can cause the notification device 92 to alarm a differential pressure abnormality warning or perform the soot-blow process in the standard mode or the cleaning mode, based on the differential pressure increase amount ($\Delta P - \Delta Pi$).

It should be noted that the above embodiment deals with an example where the air injection nozzles 82 are each arranged on the side wall of the casing part 74 on the upstream side of the first NOx catalyst 71 at the uppermost stream; however, the present invention is not limited to such a structure. The position of disposing the air injection nozzles 82 on the casing part 74 may be any position other than the upstream side of the first NOx catalyst 71.

For example, in FIG. 3, the air injection nozzles 82 may be arranged on the side wall of the casing part 74 between the first NOx catalyst 71 and the second NOx catalyst 72. In this case, for example, a part of the soot removed from the surface of the first NOx catalyst 71 may temporarily dispersed to the upstream side of the first NOx catalyst 71. However, the dispersed soot will be led to the downstream side by the flow of the exhaust gas to pass the through holes of the NOx catalyst 75, and further led to the downstream side.

As described, the force of the impulse wave IW can act throughout the surface of the NOx catalyst 75 in contact with the exhaust gas, no matter what position of the side wall of the casing part 74 the air injection nozzles 82 are arranged. Thus, the soot is evenly removed from the NOx catalyst 75. That is, even when the position of the casing part 74 for disposing the air injection nozzle 82 is a position other than the upstream side of the first NOx catalyst 71, the similar action and effect obtained by disposing the air injection nozzle 82 on the side wall of the casing part 74 on the upstream side of the first NOx catalyst 71 as hereinabove described can be obtained.

Further, the above embodiment deals with an example where the air injection nozzles 82 are arranged on a single side wall of the casing part 74 constituted by a quadrangular tube; however, the air injection nozzles 82 may be arranged on a plurality of side walls. In this case too, the similar action and effect obtained by disposing the air injection nozzles 82 on a single side wall can be obtained.

Further, the present embodiment deals with an example where the exhaust gas purification device 50 is provided in the exhaust system of the power generation engine 25; however, the present invention is not limited to this. The exhaust gas purification device 50 of the embodiment may be provided, for example, in an exhaust system of the main engine of a ship, or in an exhaust system of a generator engine and the like installed on land.

Although several embodiments of the present invention are described, these embodiments are intended to serve as examples, and not intended to limit the scope of the present invention. These novel embodiments can be implemented in various forms, and various omissions, substitutions, and modification can be made without departing from the spirit of the invention. These embodiments and modifications thereof are encompassed in the scope and subject matter of the invention and are encompassed in the scope of the claims and the equivalent thereof.

REFERENCE SIGNS LIST 1 ship
2 ship hull
3 cabin
4 funnel
5 propeller
6 rudder
7 ship bottom
8 skeg
9 propeller shaft
10 hold
11 engine room
13 upper deck
14 second deck
15 third deck
16 inner bottom plate
21 main engine
22 speed reducer
23 power generator
24 diesel generator
25 power generation engine
26 generator
30 exhaust path
31 bypass path
32 main path
33 composite casing
33a outline casing
34 joined path
35 mixer
36 first on-off valve
37 second on-off valve
40 partition plate
41 main side introduction pipe
42 bypass side introduction pipe
43 upstream side end surface
44 exhaustion outlet portion
45 delivery pipe
50 exhaust gas purification device
51 urea water injection nozzle
52 urea supply passage
53 air supply passage
54 pressurized air supply pump
55 air tank
56 urea-use air valve
57 urea supply urea water supply pump
58 switching valve
59 urea water tank
60 differential pressure sensor
60a upstream side pressure detection unit
60b downstream side pressure detection unit
61 exhaust gas temperature sensor
70 catalytic reaction unit
71 first NOx catalyst
72 second NOx catalyst
73 third NOx catalyst
74, 76 casing part
75 NOx catalyst
80 soot-blower unit
81 reserve tank
82 air injection nozzle
83 injection valve 84 pressure control valve
85 air supply passage
85a blow pipe
85b nozzle pipe
90 control device
91 GPS device
92 notification device

The invention claimed is:

1. An exhaust gas purification device having a function of removing soot adhered to a plurality of catalysts arranged inside a casing by injecting pressurized air, comprising:
a plurality of air injection nozzles arranged on a side wall of the casing, each air injection nozzle configured to generate an impulse wave within the casing by injecting the pressurized air into the casing, the plurality of air injection nozzles are positioned upstream of the plurality of catalysts with respect to a direction of a flow of exhaust gas through the casing, wherein:
the plurality of air injection nozzles successively inject one by one the pressurized air, for a duration of t1, into the casing, with predetermined time intervals of a duration t2 between the successive injections;
the duration of t1 is between 0.1 seconds and 0.5 seconds and the duration of t2 is between 30 seconds and 5 minutes; and
the impulse wave applies a force on the plurality of catalysts which causes pressure fluctuations and causes the soot adhered to the plurality of catalysts to be removed.

2. The exhaust gas purification device according to claim 1, wherein the exhaust gas purification device is configured such that pressurized air is not injected from any of the plurality of air injection nozzles for a predetermined period after a last air injection nozzle of the plurality of air injection nozzles injects pressurized air.

3. The exhaust gas purification device according to claim 1, wherein:
the casing comprises a quadrangular tube, and
each air injection nozzle of the plurality of air injection nozzles is arranged on a single side wall of the quadrangular tube.

4. The exhaust gas purification device according to claim 1, wherein a flow quantity of pressurized air injected from one of the plurality of air injection nozzles varies depending on a number of the plurality of air injection nozzles.

5. The exhaust gas purification device according to claim 1, wherein a flow quantity of pressurized air injected from one of the plurality of air injection nozzles decreases with an increase in a number of the plurality of air injection nozzles.

6. The exhaust gas purification device according to claim 1, wherein the plurality of catalysts are arranged in the direction of the flow of the exhaust gas through the casing, wherein the plurality of air injection nozzles are arranged perpendicular to the direction of the flow of the exhaust gas through the casing.

7. The exhaust gas purification device according to claim 6, wherein the plurality of air injection nozzles are integrated on the side wall of the casing.

8. The exhaust gas purification device according to claim 1, wherein:
the plurality of air injection nozzles comprise non-directional nozzles;
the impulse wave generated from each of the plurality of air injection nozzles has no directivity; and
the impulse wave spherically propagates inside the casing.

9. The exhaust gas purification device according to claim 2, wherein the plurality of air injection nozzles are arranged along the side wall of the casing at regular intervals in a direction of the casing that is perpendicular to the direction of the flow of the exhaust gas through the casing.

10. The exhaust gas purification device according to claim 1, further comprising an air supply passage configured to provide the pressured air to one or more air injection nozzles of the plurality of air injection nozzles.

11. An exhaust system comprising:
an exhaust gas purification device comprising:
a casing;
a plurality of catalysts arranged inside the casing; and
a plurality of air injection nozzles arranged on a side wall of the casing, each air injection nozzle configured to generate an impulse wave within the casing by injecting pressurized air into the casing, the plurality of air injection nozzles are positioned upstream of the plurality of catalysts with respect to a direction of a flow of exhaust gas through the casing,
wherein the impulse wave is configured to remove soot adhered to the plurality of catalysts upon impingement of the impulse wave on the plurality of catalysts;
an air supply passage configured to provide the pressurized air to one or more each of the plurality of air injection nozzles; and
a controller configured to cause the plurality of air injection nozzles to successively inject one by one the pressurized air for an air injection duration into the casing with predetermined time intervals between the successive injections.

12. The exhaust system according to claim 11, wherein the controller is configured to send activation signals to multiple valves of the air supply passage to cause the air injection duration of the plurality of air injection nozzles between 0.1 seconds and 0.5 seconds and to cause the predetermined time intervals between the successive injections to be between 30 seconds and 5 minutes.

13. The exhaust system according to claim 11, wherein:
the casing comprises a composite casing that includes a partition and that defines two paths; and
the partition separates the two paths.

14. The exhaust system according to claim 11, wherein:
the casing comprises a quadrangular tube portion;
the plurality of air injection nozzles are arranged in a width direction on a single side wall of the casing; and
a direction of an injection port of the plurality of air injection nozzles is arranged perpendicular to the direction of the flow of the exhaust gas through the casing.

15. The exhaust system according to claim 11, wherein:
the plurality of air injection nozzles comprise non-directional nozzles; and
the impulse wave is configured to spherically propagate in the casing.

16. A method of operating an exhaust gas purification device, the method comprising:
injecting, by a first air injection nozzle of a plurality of air injection nozzles arranged on a side wall of a casing of the exhaust gas purification device and upstream of a plurality of catalysts of the exhaust gas purification device, first pressurized air into the casing for a first duration between 0.1 seconds and 0.5 seconds to generate a first impulse wave within the casing, the first impulse wave configured to remove soot adhered to the plurality of catalysts upon impingement of the first impulse wave on the plurality of catalysts; and after a time interval between 30 seconds and 5 minutes, injecting, by a second air injection nozzle of the plurality of air injection nozzles, second pressurized air into the casing for a second duration between 0.1 seconds and 0.5 seconds to generate a second impulse wave within the casing, the second impulse wave configured to remove soot adhered to the plurality of catalysts upon impingement of the second impulse wave on the plurality of catalysts.

17. The method according to claim 16, further comprising, after a period of longer than 20 minutes from an end of a final injection of a last air injection nozzle of the plurality of air injection nozzles, injecting, by the first air injection nozzle, third pressurized air into the casing for a third duration between 0.1 seconds and 0.5 seconds to generate a third impulse wave within the casing.

18. The method according to claim 16, further comprising, after a second time interval between 30 seconds and 5 minutes, injecting, by the second air injection nozzle of the plurality of air injection nozzles, fourth pressurized air into the casing for a fourth duration between 0.1 seconds and 0.5 seconds to generate a fourth impulse wave within the casing.

19. The method according to claim 16, wherein:
the casing comprises a quadrangular tube portion;
the plurality of air injection nozzles are arranged in a width direction on a single side wall of the casing; and
a direction of an injection port of the plurality of air injection nozzles is arranged perpendicular to a direction of a flow of exhaust gas through the casing.

* * * * *